United States Patent
Biyani et al.

(10) Patent No.: US 8,644,127 B2
(45) Date of Patent: Feb. 4, 2014

(54) SYSTEMS AND METHODS FOR MITIGATING SELF-INDUCED FAR-END CROSSTALK

(75) Inventors: Pravesh Biyani, New Delhi (IN); Laurent Francis Alloin, Monmouth Beach, NJ (US); Shankar Prakriya, New Delhi (IN); Surendra Prasad, New Delhi (IN); Amitkumar Mahadevan, Freehold, NJ (US)

(73) Assignees: Ikanos Communications, Inc., Fremont, CA (US); Indian Institute of Technology, New Delhi (IN)

( * ) Notice: Subject to any disclaimer, the term of this patent is extended or adjusted under 35 U.S.C. 154(b) by 428 days.

(21) Appl. No.: 12/713,482

(22) Filed: Feb. 26, 2010

(65) Prior Publication Data

US 2010/0220823 A1 Sep. 2, 2010

Related U.S. Application Data

(60) Provisional application No. 61/156,361, filed on Feb. 27, 2009, provisional application No. 61/156,381, filed on Feb. 27, 2009.

(51) Int. Cl.
*H04J 1/12* (2006.01)
*H04B 3/32* (2006.01)

(52) U.S. Cl.
CPC .... *H04B 3/32* (2013.01); *H04J 1/12* (2013.01)
USPC ...................................................... 370/201

(58) Field of Classification Search
USPC .................. 370/201, 268; 375/222, 260, 267; 379/417
See application file for complete search history.

(56) References Cited

U.S. PATENT DOCUMENTS

| | | | |
|---|---|---|---|
| 6,292,559 B1 | 9/2001 | Gaikwad | |
| 6,990,196 B2 | 1/2006 | Zeng et al. | |
| 6,999,583 B2 | 2/2006 | Valenti et al. | |
| 7,023,908 B2 | 4/2006 | Nordstrom et al. | |
| 7,315,592 B2 | 1/2008 | Tsatsanis et al. | |
| 7,577,209 B2 | 8/2009 | Poon | |
| 7,835,368 B2 | 11/2010 | Duvaut et al. | |
| 2001/0004383 A1* | 6/2001 | Nordstrom et al. | 375/222 |
| 2001/0055332 A1 | 12/2001 | Sadjadpour et al. | |
| 2003/0072380 A1 | 4/2003 | Huang | |
| 2003/0137925 A1 | 7/2003 | Zamir | |
| 2005/0105473 A1* | 5/2005 | Hausman et al. | 370/249 |
| 2006/0002462 A1 | 1/2006 | Park | |

(Continued)

OTHER PUBLICATIONS

International Search Report and Written Opinion for PCT/US2010/025526. May 3, 2010.

(Continued)

*Primary Examiner* — Pao Sinkantarakorn
*Assistant Examiner* — Richard K Chang
(74) *Attorney, Agent, or Firm* — Pillsbury Winthrop Shaw Pittman LLP

(57) ABSTRACT

Systems and methods for partial self-FEXT (far-end crosstalk) are described. One method, among others, comprises determining one or more instantaneous characteristics of an input signal, wherein the one or more instantaneous characteristics comprise one or more of amplitude of the input signal and an energy level of the input signal. The method further comprises selecting one or more disturbers to cancel according to the one or more instantaneous characteristics, wherein selecting one or more disturbers is performed on a per-DMT (discrete multi-tone) symbol basis.

21 Claims, 23 Drawing Sheets

(56) References Cited

U.S. PATENT DOCUMENTS

| | | | |
|---|---|---|---|
| 2006/0056522 | A1 | 3/2006 | Tsatsanis et al. |
| 2006/0227815 | A1 | 10/2006 | Khan |
| 2007/0004286 | A1* | 1/2007 | Hobbel .................. 439/676 |
| 2007/0110135 | A1 | 5/2007 | Guess et al. |
| 2008/0130478 | A1* | 6/2008 | Schenk .................. 370/201 |
| 2008/0298510 | A1* | 12/2008 | Jonsson .................. 375/326 |
| 2009/0257581 | A1 | 10/2009 | Biyani et al. |
| 2010/0278033 | A1* | 11/2010 | Ilani .................. 370/201 |
| 2010/0278328 | A1 | 11/2010 | Mahadevan et al. |

OTHER PUBLICATIONS

ISR and WO for related PCT Application No. PCT/US2008/080470 mailed Dec. 16, 2008.

ISR and WO for related PCT Application No. PCT/US2008/087906, mailed Feb. 13, 2009.

Benveniste, et al. "Adaptive Algorithms for Stochastic Approximations," Springer Verlag, New-York, 1990.

Biyani, et al., "Cooperative MIMO Alien Noise Cancellation in Upstream VDSL", accepted for presentation at ICASSP 2009, Taipei, Taiwan, Apr. 2009.

Bliss, et al., "Environmental Issues for MIMO Capacity" IEEE Transaction on Signal Processing, vol.-50, No. 9, pp. 2128-2142, Sep. 2002.

Cendrillon et al., "Improved Linear Crosstalk Precompensation for DSL," in Processing IEEE ICASSP, May 2004, pp. 1053-1056.

Cendrillon, et al., "Partial Crosstalk Cancellation for Upstream VDSL," EURASIP Journal on Applied Signal Processing, Mar. 3, 2003; vol. 10, pp. 1520-1535.

Duvaut, et al., "Adaptive Off-Diagonal MIMO Pre-coder (ODMP) for Downstream DSL Self FEXT Cancellation", Proceedings of the IEEE Global Telecommunications Conference, Globecom 2007, Washington DC, Nov. 26-30, 2007.

Duvaut, et al., "Adaptive Off-Diagonal MIMO Canceller (ODMC) for VDSL Upstream Self FEXT Mitigation", proceedings of EUSIPCO 2008, Lausanne, Switzerland, Aug. 2008.

Duvaut, et al., Gvsl: Answers to questions and concerns related to reporting the error(f) for Self FEXT cancellation, ITU Telecommunication Standardization Sector, Study Group 15, Napa Valley, CA, Apr. 16-20, 2007.

Duvaut, et al., "G.vdsl: Proposed Requirements on Back Channel for Estimating MIMO Channel in VDSL2", Conexant Systems Inc., CD-041, Denver, Colorado, Sep. 25-29, 2006.

Duvaut, et al., "Updated Proposal for Construction of a MIMO Channel Model for Evaluation of FEXT Cancellation Systems," Conexant Systems Inc., NIPPNAI-2007-009R1, San Francisco, California, Dec. 5-7, 2006.

Duvaut, et al.,"G.vdsl: Using Error Samples for Downstream Self FEXT Cancellation Pre-coding in VDSL2," Conexant Systems Inc., SD-052, San Diego, California, 2007.

Forouzan, et al., "Computationally Efficient Partial Crosstalk Cancellation in Fast Time-Varying DSL Crosstalk Environments", EURASIP Journal on Advances in Signal Processing, vol. 2007 Article ID 72041.

ITU-T, G.993.2, "Very High Speed Digital Subsciber Line Transceiver 2 (VDSL2)", Series G: Transmission Systems and Media, Digital Systems and Networks-Digital Sections and Digital Line System-Access Networks, Feb. 2006.

ITU-T, G. 993.5,"Self-FEXT Cancellation (Vectoring) for use with VDSL2 Transceivers", Series G: Transmission System and Media Digital Systems and Networks, Digital sections and digital line system-Access networks, Apr. 2010.

Ginis, et al, "Alien Crosstalk Cancelation for Multipair DSL Systems", EURASIP Journal on Applied Signal Processing, vol. 2006, p. 1-12.

Ginis, et al., "Vectored Transmission for Digital Subscriber Line Systems," IEEE Journal of Selected Areas in Communications, Jun. 2002; vol. 20, No. 5, pp. 1085-1104.

Ilani, Ishai, "Channel Estimation by "Abuse" of Receivers," Actelis Networks, NIPPNAI-098, Savannah, Georgia, Jun. 26-29, 2006.

Jagannathan, et al, "Spatial Noise Cancellation Using Extra Wire-Pairs in the DSL Downstream", NIPP-NAI-2006-129R1, Vancouver, BC, Canada, Oct. 9-12, 2006.

Karipidis, et al., "Crosstalk Models for Short VDSL2 Lines from 30MHz Measured Data", Eurasip Journal on Applied Signal processing, vol. 2006, Article 85859, pp. 1-9.

Leshem, et al., "A Low Complexity Coordinated FEXT Cancellation for VDSL" ICECS, Dec. 2004, pp. 338-341.

Louveaux, et al., "Adaptive DSL Crosstalk Precancellation Design Using Low-Rate Feedback From End Users," IEEE Signal Processing Letters, vol. 13, No. 11, pp. 665-668, Nov. 2006.

Louveaux et al., "Error Sign Feedback as an Alternative to Pilots for Tracking of FEXT Transfer Functions in Downstream VDSL," EURASIP Journal Applied Signal Processing, Article ID 94105vol. 2006, pp. 1-14.

Sjoberg, et al., "G.vdsl: Using Orthogonal Pilot Sequences for Assisting FEXT Channel Estimation in Vector Transmission", Upzide Labs, ITU SD-036, San Diego, California Jan. 15-19, 2007.

Tsatsanis, M."Vectoring Techniques for Multi-Line 10MDSL Systems," T1E1.4 committee, contribution 2002-196, Aug. 2002.

Tsiaflakis, et al., "Partial Crosstalk Cancellation in a Multi-User xDSL Environment," Proceedings of IEEE International Conference on Communications (ICC '06), vol. 7, pp. 3264-3269, Istanbul, Turkey, Jun. 2006.

Wiese, et al., "Programmable Implementation of xDSL Transceivers", IEEE Communication Magazine, vol. 38, Issue 5, May 2000.

* cited by examiner

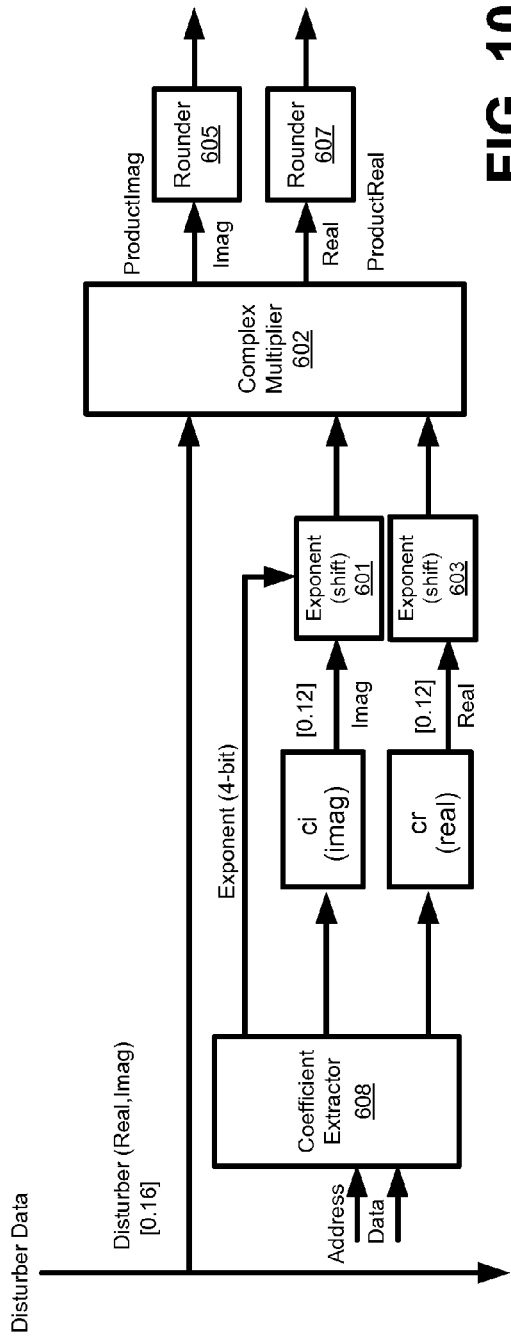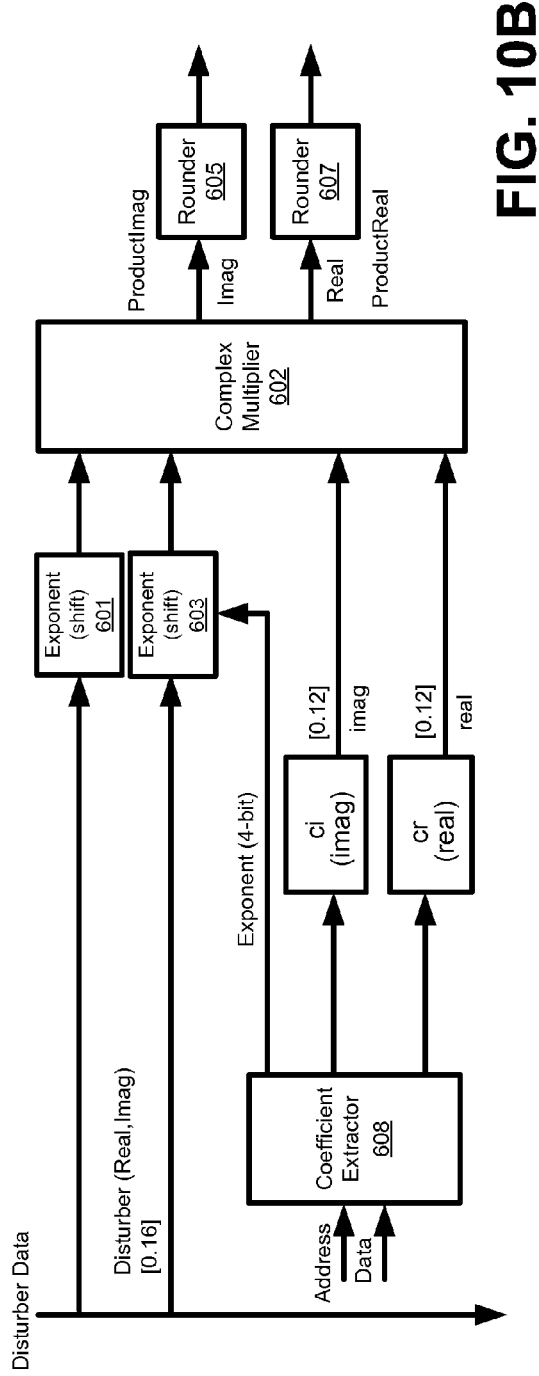

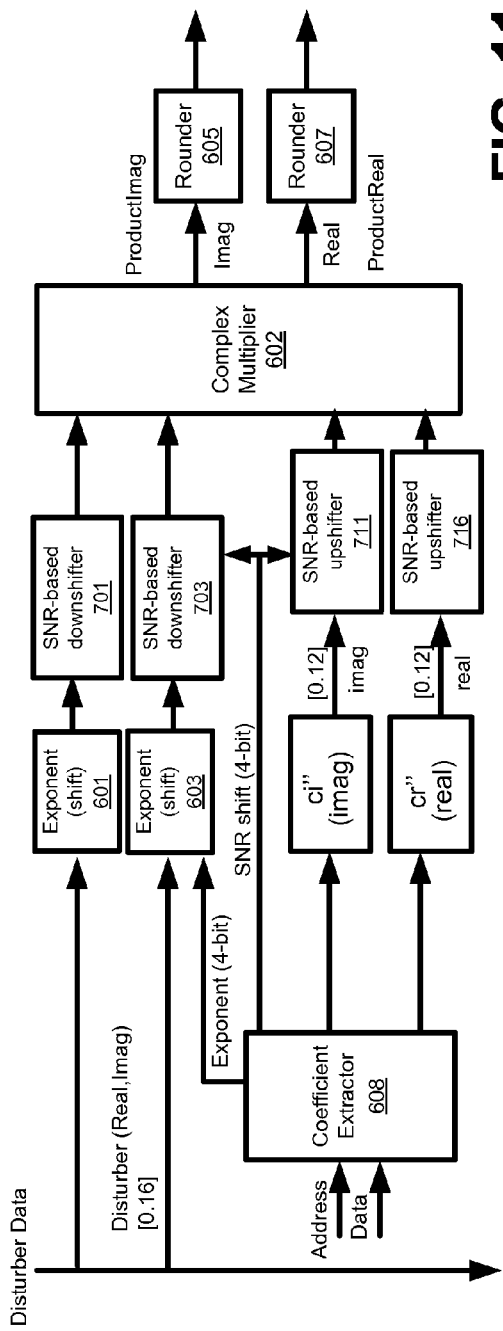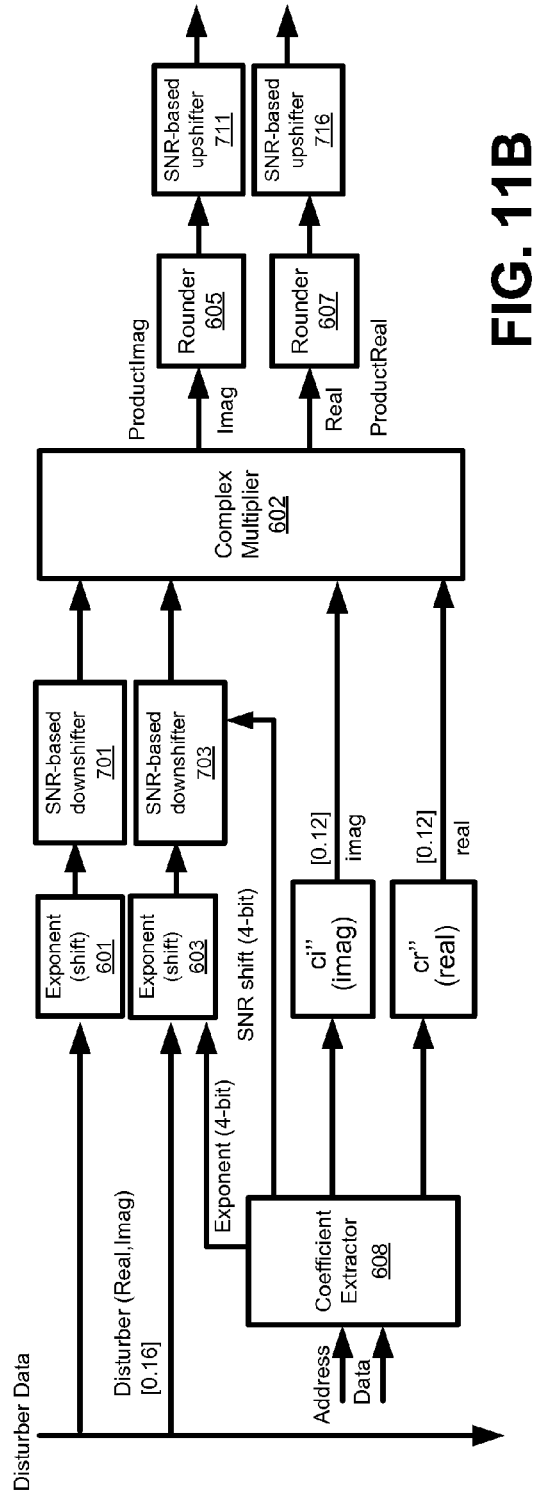
FIG. 11A
FIG. 11B

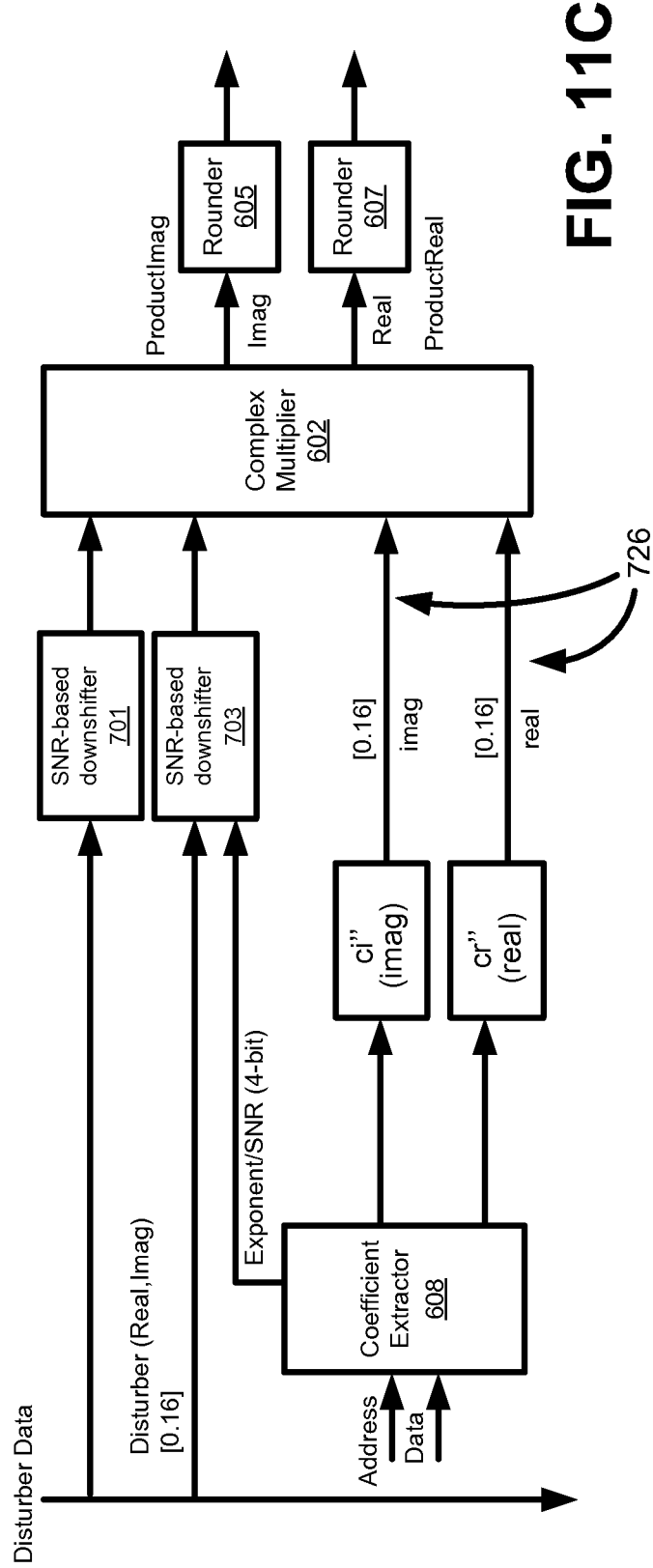

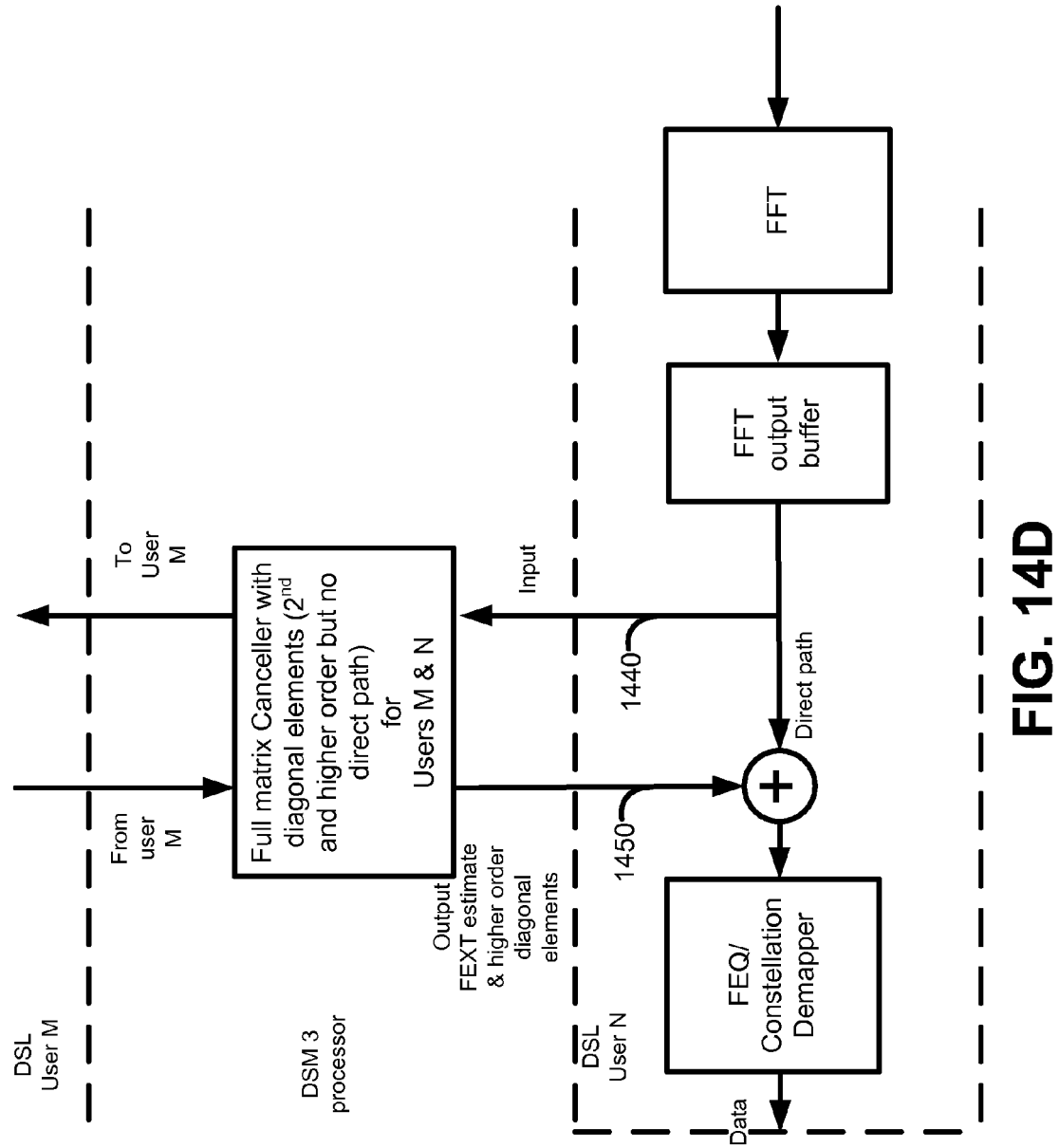

SYSTEMS AND METHODS FOR MITIGATING SELF-INDUCED FAR-END CROSSTALK

CROSS-REFERENCE TO RELATED APPLICATION

This application claims priority to and the benefit of U.S. Provisional Patent Application entitled, "Instantaneous Partial Self-FEXT Cancellation and Precoding in VDSL Using Received/Transmit Symbol Energy Information at the CO," having Ser. No. 61/156,361, filed on Feb. 27, 2009, herein incorporated by reference in its entirety. This application also claims priority to and the benefit of U.S. Provisional Patent Application entitled, "Off Diagonal Architecture of DSM3 Processor," having Ser. No. 61/156,381, filed on Feb. 27, 2009, also herein incorporated by reference in its entirety.

BACKGROUND

In VDSL systems, one of the major factors in limiting rates comes from self-FEXT (self-induced far-end crosstalk). Generally, devices for mitigating self-FEXT are CO-centric and require signal cooperation, also known as signal vectoring, across the different ports that are involved in an aDSM-3 session. Vectoring enables the CO (central office) to access transmit and receive symbols of the vectored users. Therefore, FEXT cancellation in both the upstream and downstream directions is generally performed at the CO. However, the computing resources available can be limited and therefore, the level of complexity of computations that the CO can process is limited.

Suppose that N represents the number of vectored users. A full, self-FEXT cancellation scheme requires computations of the order ($N^2$) per DMT symbol period. Note that the total number of tones engaged is nearly 4,096 and with just 10 vectored users, the complexity level for total self-FEXT cancellation is on the order of billions of flops per second. Moreover, the power dissipation in the FEXT mitigation devices is also proportional to the complexity of the FEXT mitigation algorithm. Those skilled in the art will appreciate that such a degree of complexity involved in any full self-FEXT cancellation cannot be met with the present day availability of silicon. As such, there is a need for optimal utilization of available computational resources at the central office in order to perform self-FEXT mitigation and enhance data rates.

SUMMARY

Briefly described, one embodiment, among others, is a method of performing per-tone FEXT (far-end crosstalk) mitigation. The method comprises determining one or more instantaneous characteristics of an input signal, wherein the characteristics comprise at least one of an amplitude level of the input signal and energy level of the input signal. The method further comprises determining whether to process the input signal for mitigation according to the one or more instantaneous characteristics of the input signal. Based on the determination of whether to process the input signal for mitigation, the input signal is processed for mitigation.

Another embodiment comprises determining one or more instantaneous characteristics of an input signal, wherein the one or more instantaneous characteristics comprise one or more of amplitude of the input signal and an energy level of the input signal. The method further comprises selecting one or more disturbers to cancel according to the one or more instantaneous characteristics, wherein selecting one or more disturbers is performed on a per-DMT (discrete multi-tone) symbol basis.

Another embodiment is a system that comprises an estimator configured to derive instantaneous characteristics for one or more disturbers. The system further comprises a selector for selecting from among the one or more disturbers to cancel according to the instantaneous characteristics, wherein the selector is configured to compare the instantaneous characteristics to a threshold. The system also comprises a far-end crosstalk (FEXT) mitigator for performing FEXT mitigation on only the selected disturbers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10A illustrates one possible implementation of a precoder or canceller unit, in which the coefficients stored in a pseudo floating point format are expanded into the real and imaginary values.

FIG. 10B depicts another implementation where the normalized coefficients are extracted and presented to the multiplier input.

FIGS. 11A-C illustrate other possible implementations of a precoder or canceller unit based on the architecture depicted in FIG. 10B

FIG. 14D illustrates how a reduction in bandwidth can be realized on a self-FEXT canceller architecture, referred to as the off-diagonal canceller architecture.

DETAILED DESCRIPTION

Figure 1:
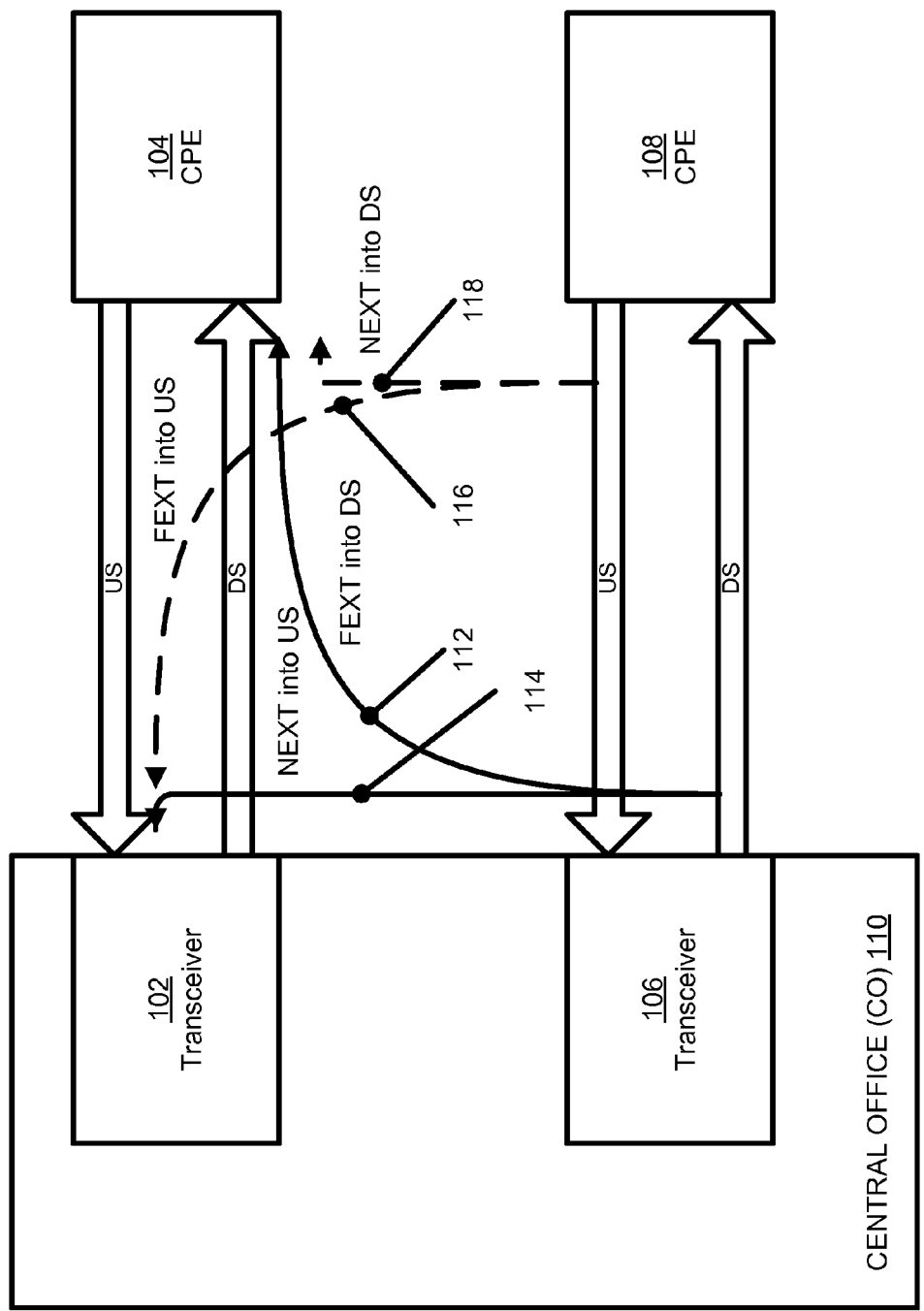
FIG. 1 illustrates the various types of crosstalk typically experienced in a DSL system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As one of ordinary skill in the art will appreciate, crosstalk is a ubiquitous source of noise in a digital subscriber line (DSL) system. FIG. 1 illustrates the various types of crosstalk typically experienced in a DSL system. For simplicity, central office (CO) 110 comprises two transceivers 102, 106 communicating over two subscriber lines to two sets of customer premises equipment (CPE) 104, 108. Transceiver 102 communicates with CPE 104, and transceiver 106 communicates with CPE 108. To illustrate, the crosstalk from CO transceiver 106 and CPE 108 to either CO transceiver 102 or CPE 104 is described. However, it should be understood that interference may also be between the transmitter and receiver on the same subscriber line in both the upstream and downstream paths, which is the near-end echo of the transmit signal.

The term "far-end" refers to scenarios in which the source of interference is away from the receiving side, and the term "near-end" refers to scenarios in which the source of interference is close to the receiving side. For example, interference shown by arrow 112 illustrates noise generated by transceiver 106 coupled into the downstream communications and received by CPE 104. The term "victim" of "victim user" refers to the line or the circuit being examined for crosstalk, and the term "disturber" describes the source of the crosstalk. Since the noise is generated away from the receiving side, this is referred to as downstream far-end crosstalk (FEXT). Likewise, interference shown by arrow 114 illustrates upstream near-end crosstalk (NEXT). Interference shown by arrow 116 illustrates upstream FEXT, and interference shown by arrow 118 illustrates downstream NEXT. In particular, FEXT is a ubiquitous source of noise in VDSL. Accordingly, various needs exist in the industry to address the aforementioned deficiencies and inadequacies, such as mitigating FEXT.

Figure 2:
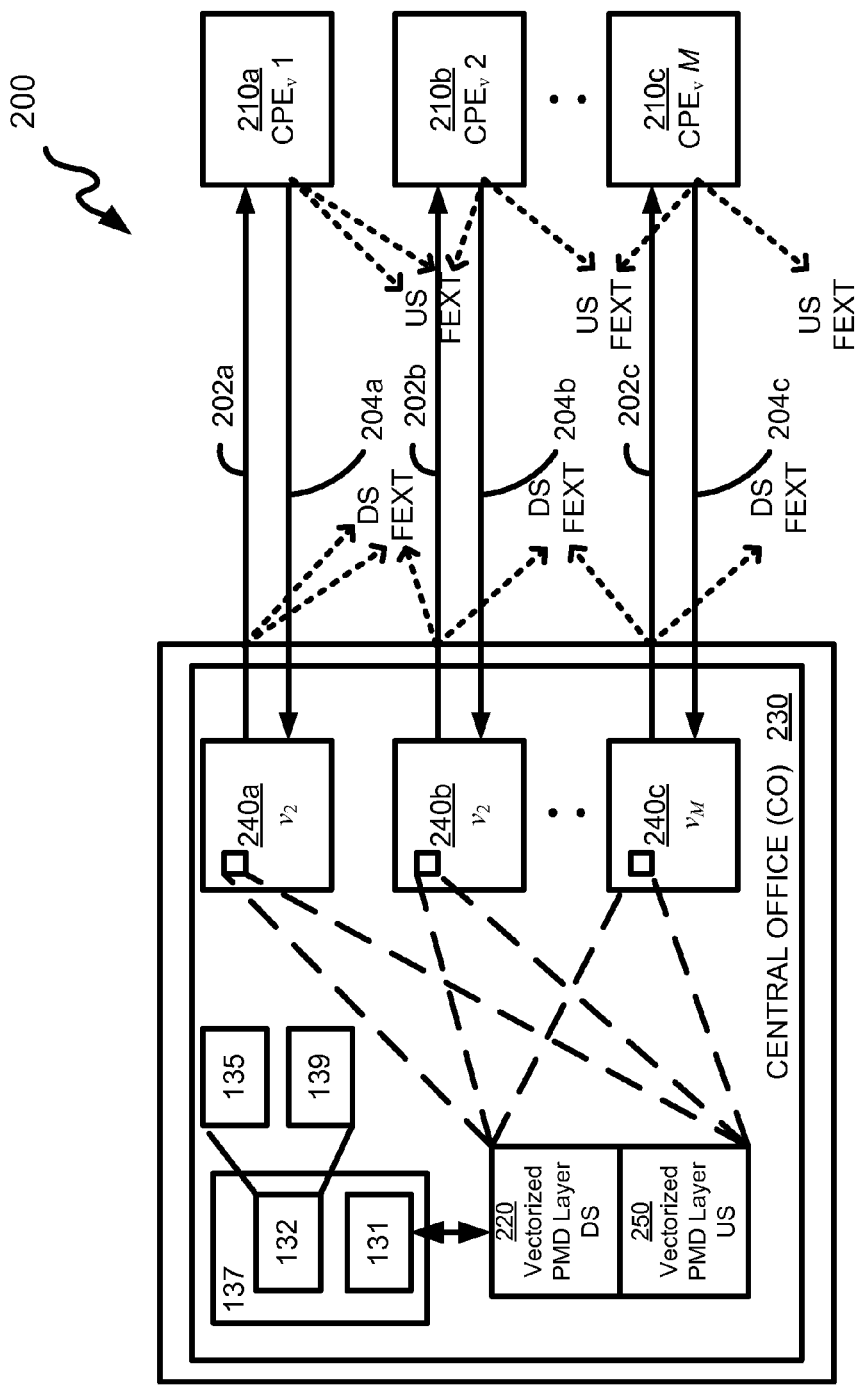
FIG. 2 illustrates a DSL system where the central office comprises a plurality of transceivers.

FIG. 2 illustrates a DSL system 200 where the CO 230 comprises a plurality of transceivers represented by transceivers 240a, 240b, and 240c. The transceivers are connected to CPEs 210a, 210b, 210c, respectively, through separate subscriber lines. In the figure, each subscriber line is broken down into its upstream and downstream paths. The downstream paths for transceivers 240a-c are indicated by arrows 202a, 202b, 202c, respectively. Similarly, the upstream paths for transceivers 240a, 240b, 240c are indicated by arrows 204a, 204b, 204c, respectively. In this figure, only three of the M vectoring enabled CPEs are shown as CPEs 210a, 210b, 210c.

As signals are transmitted downstream from the CO 230 onto the DSL loops, a certain amount of energy leaks from one downstream CO transmitter into an adjacent CPE receiver, thereby creating undesired FEXT into adjacent receivers. To address FEXT, the transceivers coupled to vectoring enabled CPEs have transmitters that can share information and coordinate transmission in the form of multiple input multiple output (MIMO) precoding signals indicated by vectorized physical medium dependent (PMD) downstream (DS) layer 220.

Figure 3:
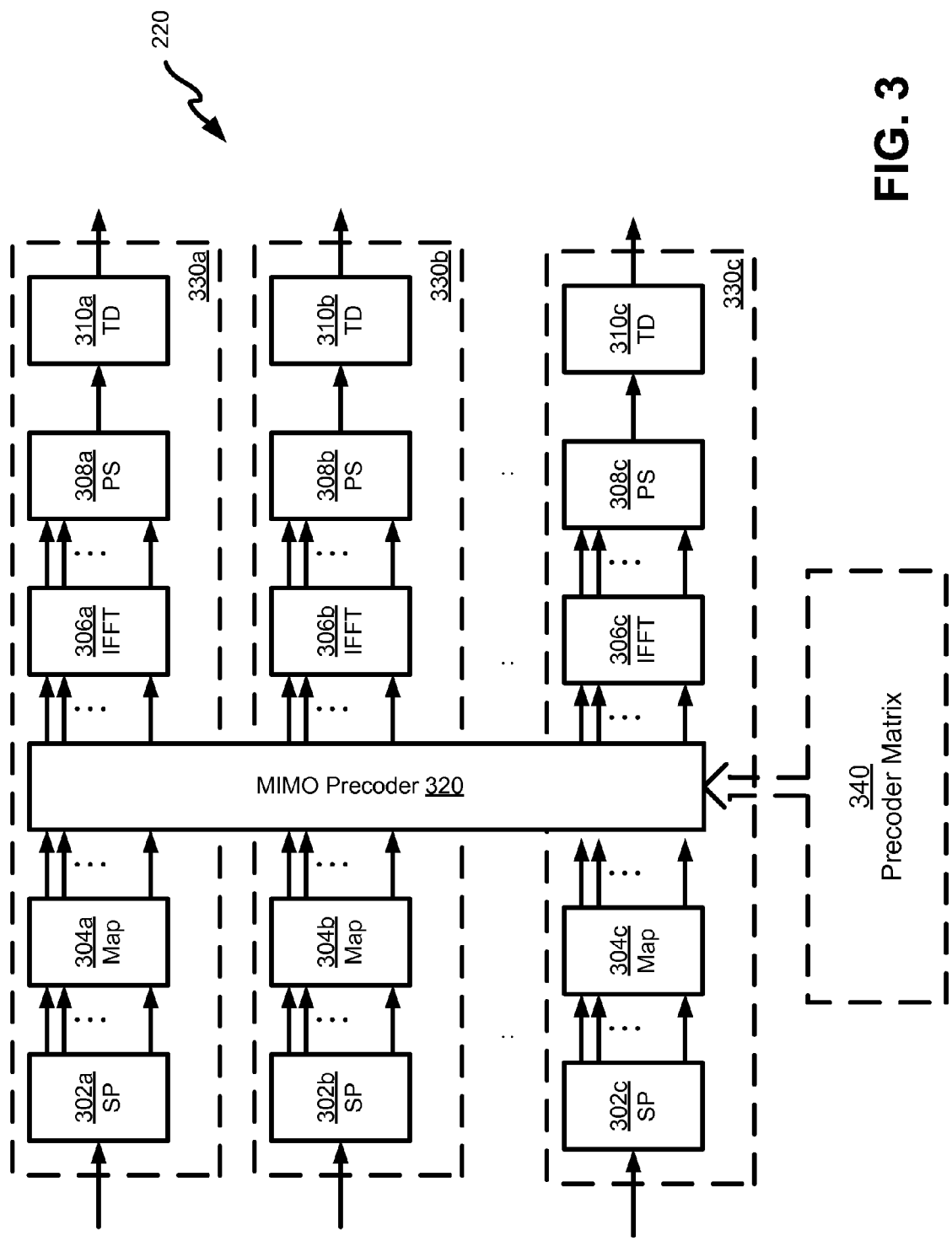
FIG. 3 illustrates an exemplary embodiment of vectorized downstream PMD layer shown in FIG. 2.

FIG. 3 illustrates an exemplary embodiment of the vectorized PMD DS layer 220 in FIG. 2. For each transceiver, the PMD layer 220 resembles that shown in FIG. 3 with a MIMO precoder 320 inserted between the mapper 304a, 304b, 304c and the IFFT 306a, 306b, 306c in each transceiver. The detailed downstream PMD layers for transceivers 240a, 240b and 240c in FIG. 2 are indicated as PMD layers 330a, 330b and 330c, respectively. They include serial-to-parallel conversion blocks 302a, 302b, 302c to convert user data for the constellation mapper 304a, 304b, 304c, as well as parallel-to-serial conversion blocks 308a, 308b, 308c to convert the IFFT output to the time domain processing blocks 310a, 310b, 310c. Generally, the purpose of the MIMO precoder 320 is to compensate at the transmitter for the undesired addition of FEXT into the subscriber lines. Precoding (or pre-cancellation) is performed by means of a matrix operation (shown as precoder matrix 340) that takes as input the transmit data samples (i.e., mapper outputs on the CO side, referred to as downstream transmit constellation points) and outputs pre-compensated data sample for input to the IFFT on the CO side. Pre-compensation is performed such that the FEXT at each of the far-end receivers in the vectored group is cancelled. For precoding to be effective, the data symbols of all users should be synchronized and aligned at the transmitter output, so that the precoder matrix 340 presents a complete independence between all subcarriers of the vectored DMT system.

With proper synchronization and alignment of DMT symbols, the precoder operation can be seen as a matrix multiplication for each subcarrier across all the users in the vectored group. In general, the per-subcarrier precoder coefficient converges towards the inverse of the FEXT coupling channel matrix that exists among the vectored users. The derivation of the precoder coefficients can be performed after a FEXT coupling channel analysis phase, during which known signal sequences are being transmitted by each transmitter with a well determined pattern. Further details for deriving optimal precoding matrices can be found in U.S. patent application Ser. No. 11/845,040 filed on Aug. 25, 2007, which is hereby incorporated by reference in its entirety.

Referring back to FIG. 2, as signals are transmitted upstream from CPEs 210a, 210b, and 210c onto the DSL loops, a certain amount of energy is effectively injected from one upstream CPE transmitter into an adjacent CO receiver, thereby creating an undesired, upstream FEXT signal into adjacent receivers. To address FEXT in the upstream direction, the upstream CO receivers coupled to vectoring enabled CPES have receivers that can share information and coordinate reception in the form of multiple input multiple output (MIMO) cancelling signals indicated by vectorized physical medium dependent (PMD) upstream layer 250.

Figure 4:
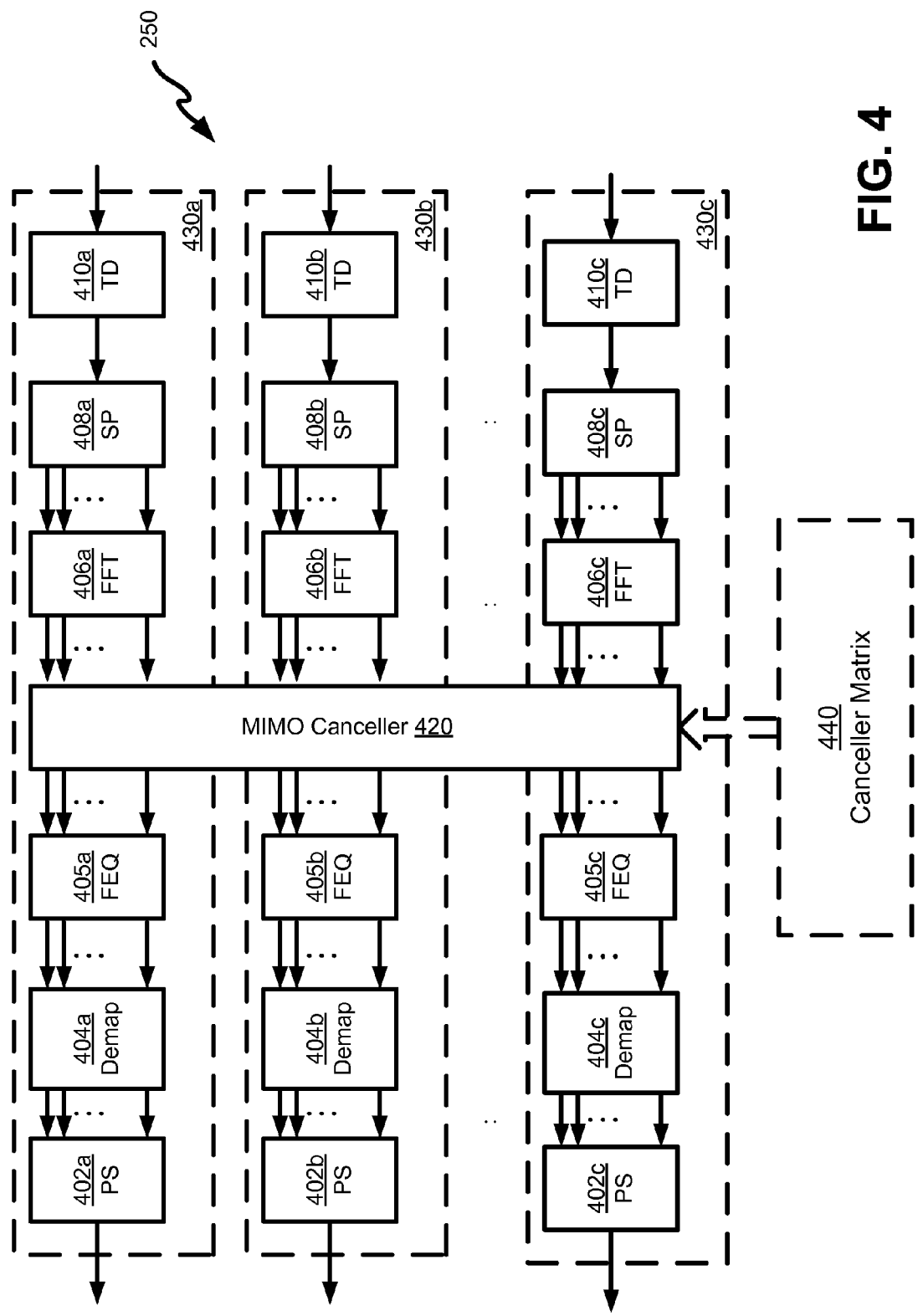
FIG. 4 illustrates an exemplary embodiment of the vectored upstream PMD layer shown in FIG. 2.

FIG. 4 illustrates an exemplary embodiment of the vectorized upstream (US) PMD layer 250 in FIG. 2. For each receiver, the PMD layer 250 in FIG. 4 comprises a MIMO canceller 420 inserted between the FFT 406a, 406b, 406c and the FEQ 405a, 405b, 405c. In alternative embodiments, the MIMO canceller 420 is inserted between the FEQ 405a, 405b, 405c and the demapper 404a, 404b, 404c. Generally, the MIMO canceller 420 performs compensation at the receiver for undesired FEXT on the subscriber lines. Cancellation is performed by means of a matrix operation (shown as canceller matrix 440) that receives data samples (i.e., FFT constellation outputs or FEQ constellation outputs) and outputs a compensated data sample for input to the FEQ or demapper.

Compensation is performed such that the FEXT at each of the receivers in the vectored group is cancelled. In order for the cancellation to effective, the data symbols of all users should be synchronized and aligned at the receiver output, so that the canceller matrix 440 presents a complete independence between all the subcarriers of the vectored DMT system. The detailed upstream PMD layers for transceivers 240a, 240b and 240c in FIG. 2 are indicated as PMD layers 430a, 430b and 430c, respectively. They include serial-to-parallel conversion blocks 302a, 302b, 302c for converting time domain data processed in the time domain processing blocks 410a, 410b, 410c to the FFT block, as well as parallel-to-serial conversion blocks 402a, 402b, 402c for converting the demapper output to user data.

One aspect that enables vectoring is precisely the alignment and the synchronization of the transmitted and received DMT symbols. As a consequence of the transmitter's alignment, the received DMT symbols are synchronized in vectoring enabled COs and CPEs. This alignment is controlled by the CO 230 and is required for synchronous operation and ensures orthogonality among the M vectoring enabled users. The orthogonality achieved by the synchronization and alignment of all users in a vectoring group allows for the simplification of the MIMO channel on a per-tone basis. In other words, even though the DSL OFDM/DMT signal extends over a wide bandwidth, because of the circulant nature of the channel due to the cyclic prefix, the equivalent MIMO system comprises N frequency channels, which can be viewed as independent tones.

As a result, the FEXT coupling transfer function between any disturber and any victim user will be seen at any given tone as a simple complex coefficient. This orthogonality property, which simplifies the self-FEXT precoding or cancellation problem to a per-tone problem with a defined set of complex input values as input to a one-tap complex channel coefficient, is key in leveraging the instantaneous cancellation concept based on the input signal energy, as described herein. Moreover, while the concept can be applied to a multiple-input/single-output system, as represented in the self-FEXT cancellation problem, where multiple disturbers impact a single victim user, the described embodiments may also be implemented in a single-input/single-output system.

Various embodiments are described for performing self-FEXT (far-end crosstalk) cancellation at the CO 230 for a given vectored user that is effective across all frequencies such that the total data rate is maximized in either direction for the same vectored victim experiencing self-FEXT. For some embodiments, partial self-FEXT cancellation comprises performing an ordering of users in the system based on coupling and input signal levels. For other embodiments, FEXT cancellation comprises a selection phase, whereby a determination regarding each disturber is made on whether or not to process the input of each respective disturber. Each determination is made independently of the contribution by the other disturbers. In accordance with such embodiments, a threshold approach is implemented for the selection phase. Various elements are used to determine the threshold that include but not limited to, the average input signal energy level, the amplitude of the coupling channel, and the targeted level of the residual FEXT after partial FEXT cancellation is performed. It should be emphasized that various embodiments for partial self-FEXT cancellation result in a reduction of power consumption and allow multiplexing or sharing of computational resources. Other embodiments also provide a reduction in the data bandwidth requirements, as will be described in more detail later.

For a given vectored victim, the average power of noise due to self-FEXT is a function of the coupling between the victim and the disturber in addition to the average transmit symbol power of the disturber. This observation led to the derivation of line selection algorithms that perform a selection of which disturbers to process in a partial cancellation scheme, based on their average transmit power and coupling into the victim user. This selection is expected to be performed at infrequent intervals in time, as the number of users, average transmit energy of each disturbers, and their relative contribution into the victim user are assumed to be slowly varying in time. For various embodiments, the variation in the instantaneous transmitted energy of the disturber is factored in, as well as the energy consequently received, in order to select the disturbers that must be cancelled on a specific tone for a given victim on a DMT symbol-by-symbol basis.

It should be noted that a related partial cancellation problem involves intelligently choosing the tones for performing FEXT cancellation according to available computations resources in order to achieve, for example, an optimum performance objective given the available resources (referred to as "tone selection"). Further, line selection and tone selection can be jointly performed. However, both line and tone selection algorithms that decide which disturbers to cancel for which tone, rely only on the energy couplings of the disturbers into the victim from the standpoint of statistical averages, while performing the actual crosstalk cancellation of the pre-selected inputs at every DMT symbol. In order words, for every DMT symbol, the same set of pre-determined disturbers are cancelled for a given victim at each DMT symbol, regardless of the fact that the amount of instantaneous FEXT from a disturber to a victim is a function of both instantaneous constellation energy of the disturber and the magnitude of the coupling. Although the average transmit power of the disturbers is constant and fixed a priori, it should be noted that the instantaneous symbol energy varies.

As a nonlimiting example, consider a 14-bit/bin QAM constellation where the ratio of the highest instantaneous constellation point energy (corresponding to the outermost constellation point) to the lowest instantaneous constellation point energy (corresponding to the constellation point closest to the origin) is 16,129, or 42 dB. Accordingly, the output of the corresponding self-FEXT channel, which may be represented as a one-tap complex multiplication operation per frequency in an orthogonal system, will experience an instantaneous energy level varying by the same 42 dB range. Thus, it should be noted that it is possible for a first disturber with a weaker FEXT coupling into a victim as compared to a second disturber to inject a higher level of instantaneous FEXT into the victim even if both disturbers transmit with the same average constellation energy. The various embodiments described take into consideration the instantaneous FEXT and perform ordering based on the coupling values as well as the energy of the transmit symbols. Based on this, FEXT cancellation is performed according to the instantaneous FEXT power.

In addition to ordering the disturbers based on the coupling values and energy of the transmit symbols, some embodiments are directed to considering each disturber's transmitted symbol independently. This may be achieved based on the relative contribution to the self-FEXT of that individual user's transmitted symbol compared to either the self-FEXT contribution of other users' transmitted symbols at the same time or to the background noise level expected to be experienced by the victim. It should also be emphasized that the embodiments described provide a higher gain in SNR when compared to conventional approaches involving line selection based on coupling only for a given tone.

As the various embodiments involve more instantaneous calculations and comparisons of the various transmit or received symbol energy, there is generally a tradeoff between the gain in data rate and the additional online computations required to accomplish this gain. As such, alternative embodiments are directed to a combination of both offline decisions based on the couplings and simple online decisions based on the symbol energy of the various disturbers. In this regard, the added complexity due to computations of the instantaneous FEXT is factored in by suggesting a low complexity architecture.

While various embodiments are directed to maximizing the performance of a system given fixed, computational resources by multiplexing the common resources between the input data from the various vectored users given the coupling between victim and disturbers and their instantaneous transmit input signal level, it should be emphasized that this also results in reduced power consumption, reduced data transfers, and reduced bandwidth requirements involving the computational resources when the input data is below a given threshold. These objectives (e.g., reduced power consumption, reduced bandwidth) may be achieved through different implementations.

The embodiments directed to partial FEXT cancellation with consideration of the level of the input data may be implemented in other systems where the input signal has a wide dynamic range (e.g., a QAM constellation) and where the corresponding coupling channel is represented by a single-tap complex or real coefficient. Such features of a coupling channel are common in a system where OFDM is implemented in which the orthogonality between carriers results in a per-tone equivalent model, where each frequency bin can be evaluated independently of others.

Figure 17:
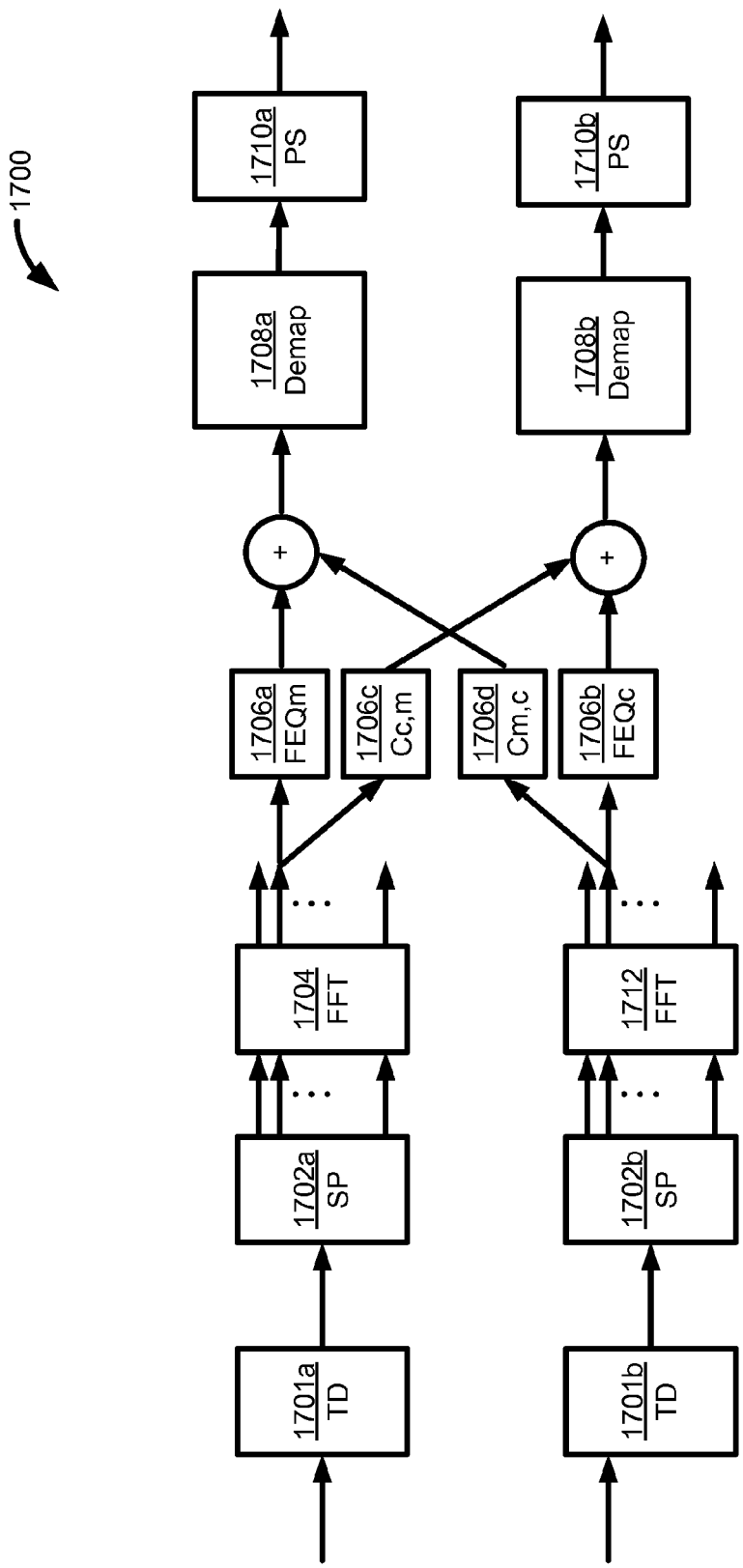
FIG. 17 illustrates an exemplary embodiment of a 2×2 MIMO receiver in which the output of the dual FFT blocks are combined on a per-tone basis before demapping the two independent data streams.

As a nonlimiting example, the various embodiments directed to leveraging partial cancellation may be implemented in a (2×2) MIMO receiver in a dual line receiver at either the CO or customer premises equipment (CPE) side, as well as in an overlap frequency domain echo canceller, which strictly cancels the impact of every input QAM tone of one direction into the corresponding receiver tone in the other direction, if its input QAM signal falls above a certain threshold. FIG. 17 illustrates an exemplary embodiment of a 2×2 MIMO receiver 1700 in which the output of the dual FFT blocks 1704, 1712 are combined on a per-tone basis before demapping the two independent data streams. The 2×2 MIMO receiver comprises a set of two direct path coefficients $FEQ_m$ 1706a and $FEQ_c$ 1706b along with a set of cross-coupling coefficients $C_{m,c}$ 1706d and $C_{c,m}$ 1706c, which subtract the interference of one channel into the other one. In FIG. 17, the dual channel receiver also includes serial-to-parallel conversion blocks 1702a and 1702b for converting time domain data processed in the time domain processing blocks 1701a and 1701b of both direct channels to the FFT blocks, as well as parallel-to-serial conversion blocks 1710a, 1710b for converting the output of the demappers 1708a, 1708b to user data.

For applications that involve coordinated transmission over two DSL pairs, the interference channel is typically of a much smaller magnitude than the corresponding direct channels. An embodiment of the partial cancellation may be implemented in the 2×2 MIMO receiver based on the determination of a threshold associated with the coupling coefficients $C_{m,c}$ and $C_{c,m}$, of each channel independently into the other and the target residual partial cancellation or background noise to be achieved on the two independent direct channels at each of the frequency. As the FFT output on each tone of each channel exhibits a large dynamic swing due to the use of a potentially large constellation size associated with the transmitted signal of the respective direct channel, the input to the cross-coupling coefficients exhibits large dynamics swing as well. The application of the partial cancellation scheme comprises considering the constellation points of the FFT output that fall above the two respective predetermined thresholds in order to be processed for cancellation into the other channel by multiplication with the coupling coefficients $C_{m,c}$ and $C_{c,m}$. By selectively processing the input signals, various advantages of power reduction and resource sharing are made possible while still allowing target residual interference noise level of each channel into the other channel.

Figure 18:
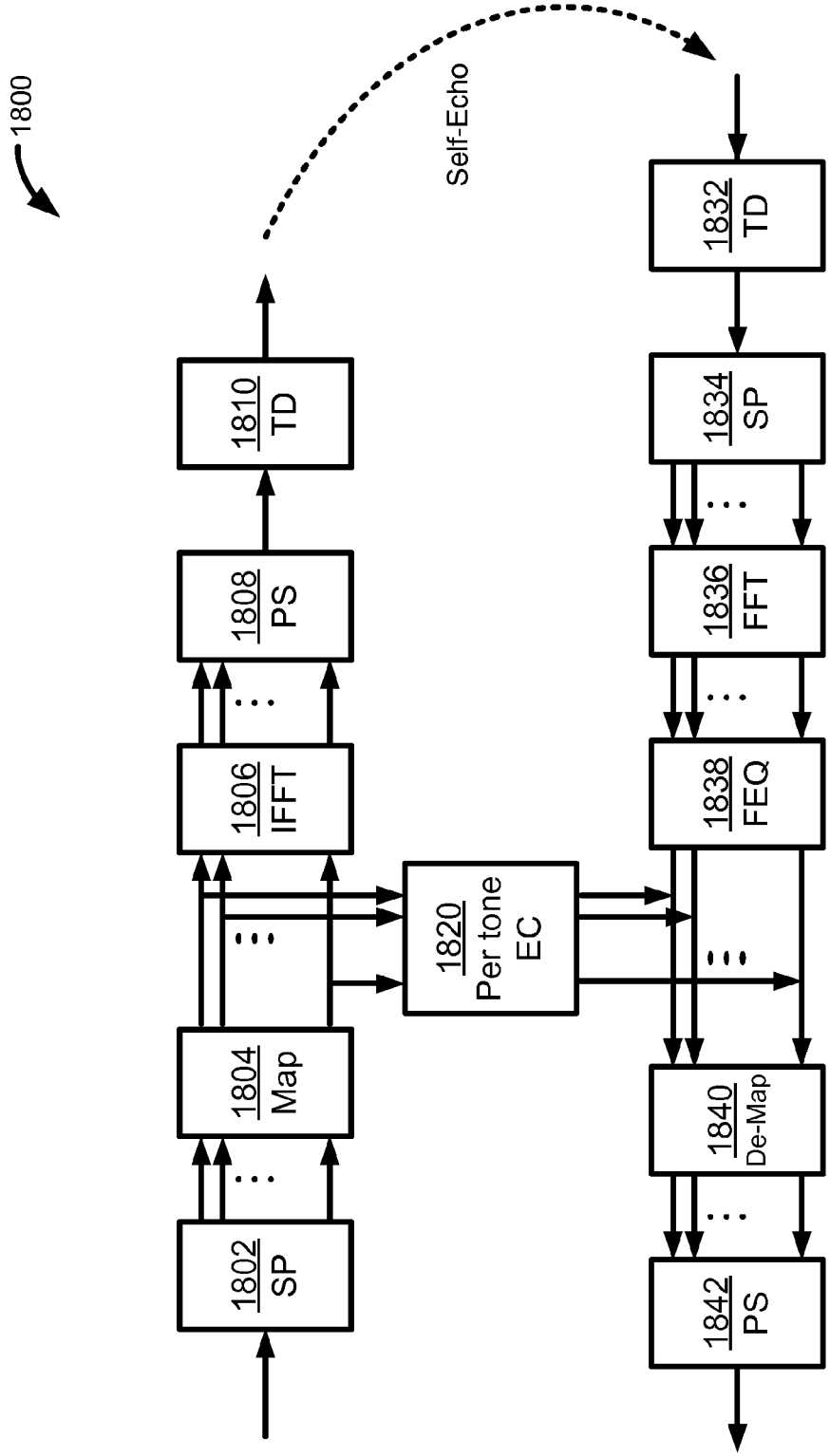
FIG. 18 illustrates an exemplary embodiment of a per-tone frequency domain echo canceller.

Similarly, the concepts described herein for the self-FEXT precoder or canceller based on the input signal level of the input QAM signal can be applied to the cancellation process of a frequency domain echo canceller, comprising per-tone of a one tap echo canceller coefficient. FIG. 18 illustrates an exemplary embodiment of a per-tone frequency domain echo canceller, which is designed to cancel the impact of the transmitter constellation signal associated with each transmit tone into the corresponding received tone located at the same frequency in a full duplex frequency overlap system. The per-tone frequency domain echo canceller 1820 receives an an input the output of the transmit mapper 1804 and generates a replica of the self-echo affecting the output of the FEQ 1838, to which it is subtracted. In an alternative embodiment, the subtraction of the replica of the self-echo takes place for each tone at the output of the FFT block 1836 and before the FEQ 1838.

With reference to FIG. 18, in the receive path, the transceiver 1800 includes a serial-to-parallel conversion block 1834 to convert time domain data processed in the time domain processing block 1832, as well as parallel-to-serial conversion block 1842 to convert the output of the demapper 1740 to user data. In the transmit path, the transceiver includes serial-to-parallel conversion block 1802 to convert user data to the mapper 1804, as well as a parallel-to-serial conversion block 1808 to convert the output of the IFFT block 1806 to the time domain block 1810. The application of the partial cancellation scheme is incorporated for every tone in the selective processing of the transmit constellation signal according to its level relative to a threshold that is determined, on the one hand, by the echo coupling coefficient of the transmit tone and the corresponding received tone and, on the other hand, by the target residual echo noise level after partial cancellation or target background noise to be achieved on the received tone. Again, by selectively processing the input signals, various advantages of power reduction and resource sharing are made possible while still allowing target residual echo noise level of each transmit signal into the corresponding received signal on a tone.

For downstream self-FEXT mitigation, the transmit symbols of all vectored users are available at the FEXT precoder. The transmit symbols are represented by the output of the mapper $304a$, $304b$, $304c$ in FIG. 3. The output of the mapper may be subject to a per-tone scaling factor before presentation to the precoder input. In general, the mapping function should be interpreted as incorporating this per-tone scaling. Thus, for a given tone, a quantification of the transmitted energy can be performed based on the position of the most significant bit (MSB) of the real and imaginary parts of the representation of the transmitted constellation points for the various users. Alternatively, the value of the data bits that are used to generate the constellation mapping may be used to quantify the energy or amplitude in the complex plane of the input signal. For upstream self-FEXT cancellation on a specific tone, only the received symbols are directly available at the CO receiver. If self-FEXT cancellation is performed after the frequency domain equalizer, the energy level of the received constellation signal will be evaluated to determine whether the cancellation process should consider this complex signal as input for the partial cancellation. As for the precoder case, energy quantification may be simplified to a component-wise (i.e., real and imaginary) magnitude comparison against a specified threshold, which offers the advantage of reduced implementation complexity as such an approach basically comprises determining whether there is any significant bit above a given position as determined by a specified threshold in its fixed point representation. The threshold determination may also be associated with the real and imaginary amplitude of the self-FEXT channel coefficient at the frequency of interest, as well as the target residual self-FEXT level that is targeted for the removal of the input signal of the disturber into the victim user.

Alternatively, in an upstream self-FEXT cancellation scheme where the input to the canceller is taken before the frequency domain equalizer, as illustrated on FIG. 4, the energy quantification process for instantaneous disturber selection is based on the real and imaginary parts of the representation of the received complex signals at the FFT output. The energy quantification may also be simplified to a component-wise (real and imaginary) magnitude comparison against a specified threshold, which may also be determined with the real and imaginary amplitude of the self-FEXT channel coefficient at the frequency of interest, as well as the target residual self-FEXT level that is targeted for the removal of the input signal of the disturber into the victim user.

For exemplary embodiments, partial FEXT cancellation is based on the input signal level of the input constellation symbol, and/or the magnitude of the equivalent self-FEXT channel response, and/or the target residual self-FEXT level desired after cancellation of the disturber signal into the victim at the particular tone of interest. As discussed earlier, this determination of the use of the disturber input in the cancellation process can be done independently of all other disturbers for a given victim, or it can be done jointly with the knowledge of the other disturbers' input and their respective channel coupling coefficients into the victim user if more than one disturber is impacting the victim at the frequency of interest. In the latter case, in order to also take the FEXT couplings into account in selecting the disturbers to be cancelled, a method based on comparing the weighted instantaneous energies for the various users (where the weights are proportional to the FEXT couplings) may be employed. Here too, component-wise magnitudes may be used instead of the energy in order to incorporate a simpler implementation. In both methods, FEXT cancellation is based primarily on the disturber's input, of which the weighted energy or amplitude is among the first few highest levels among all disturbers. As such, the disturbers' inputs that have a relative contribution of self-FEXT that is less significant than the first set of disturbers may be discarded from the FEXT cancellation process.

Figure 5:
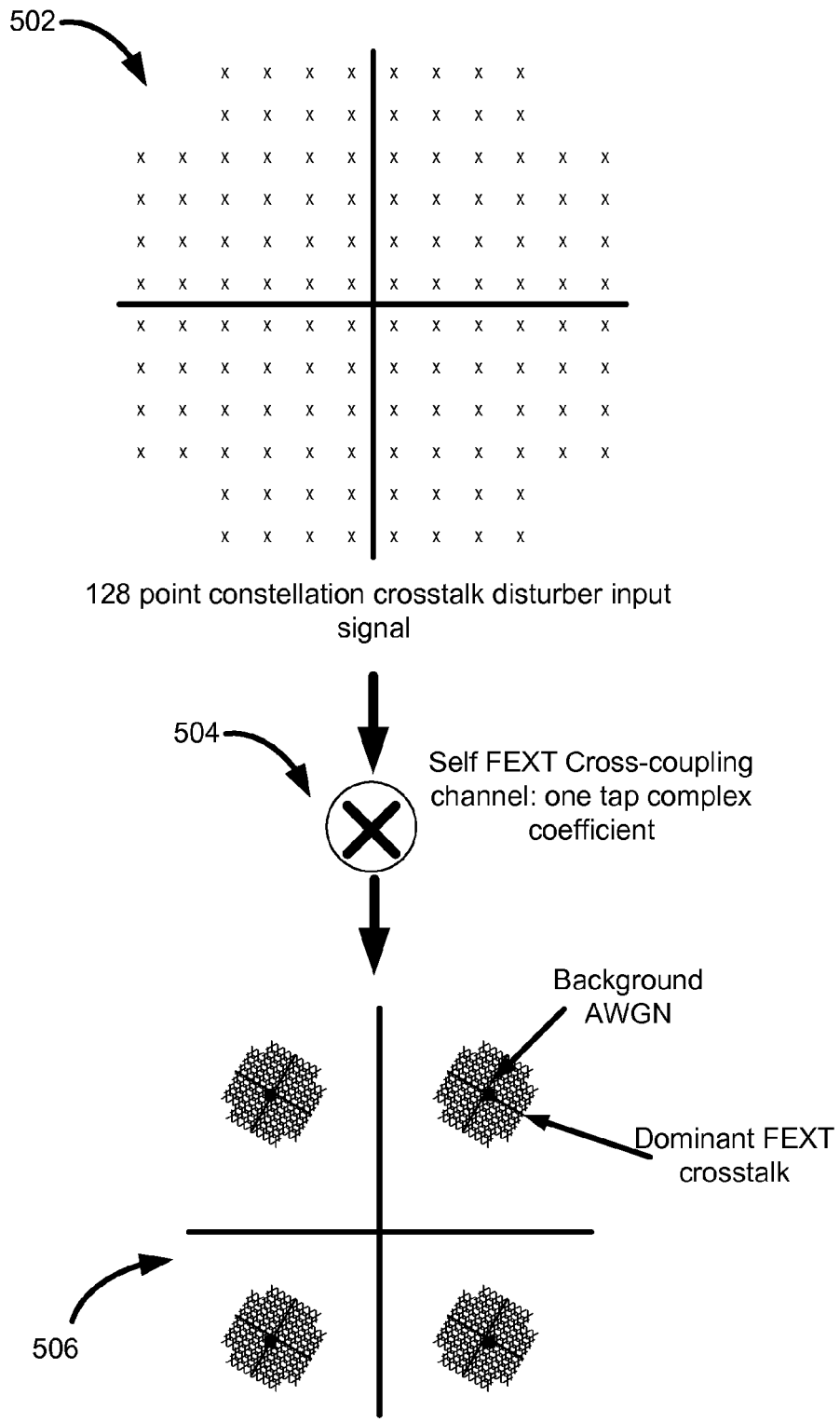
FIG. 5 illustrates the disturber input and its impact on a victim user, as experienced at the receiver of the victim.

Reference is now made to FIG. 5, which illustrates the disturber input and its impact to the victim user, as seen at the receiver of the victim. In this nonlimiting example, the disturber input is represented by a 128-point QAM constellation 502, which cross-couples through the self-FEXT channel 504 and is superimposed on the victim signal 506, represented here as a 4 QAM signal. The 4 QAM constellation (after direct channel equalization at the receiver) is shown with self-FEXT noise associated with the disturber. The distribution of the received signal is compared to the same 4 QAM constellation points affected by an AWGN level of noise without self-FEXT. For various embodiments, an objective of the partial cancellation process is to reduce the level of self-FEXT to a level that is less than that of the background noise level. The threshold to be applied for the determination of the input signal of the disturber considered in the cancellation process can be based on the energy of the constellation point of the input signal, and can therefore be applied, as a radius on the constellation input signal. In particular, constellation points that fall below this radius would not be considered as input to the cancellation process, while those lying outside of the radius would be considered for the partial cancellation process.

Figure 6:
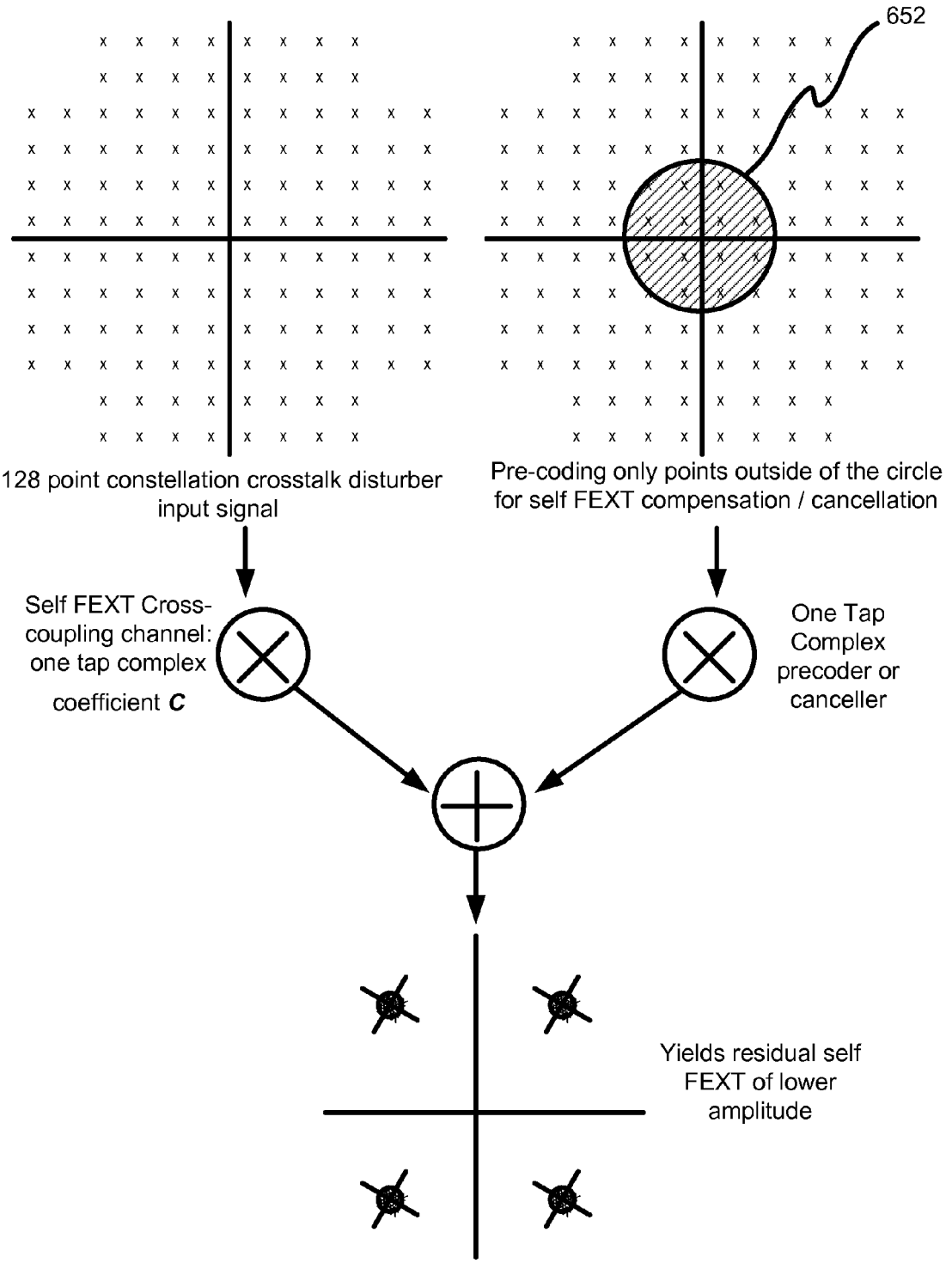
FIG. 6 illustrates an embodiment for selecting constellation points for partial self-FEXT cancellation.
Figure 7:
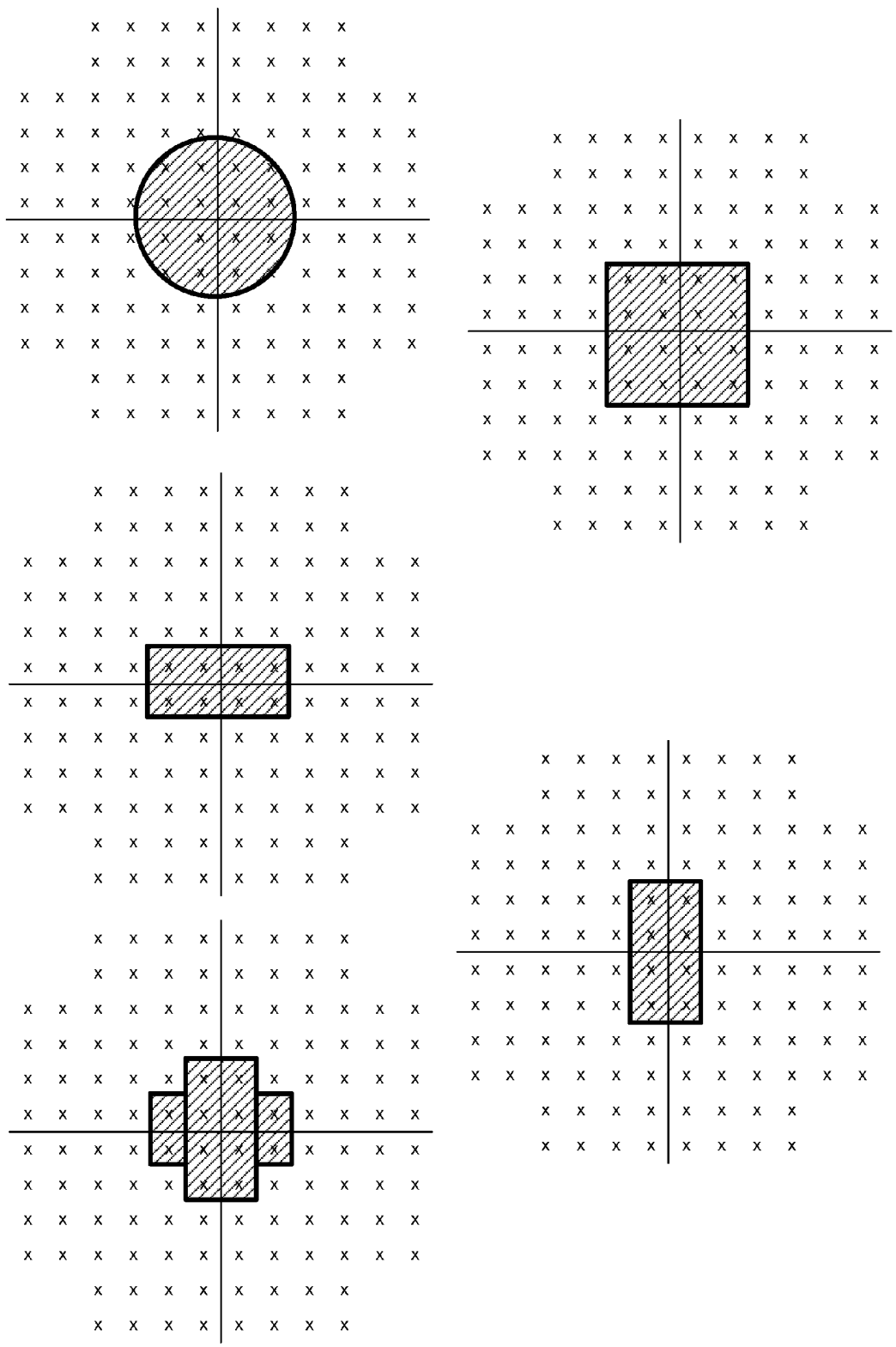
FIG. 7 illustrates other embodiments of decision boundaries that may be utilized for selecting disturber inputs for purposes of partial FEXT cancellation, as shown in FIG. 6.

Referring now to FIG. 6, the self FEXT cross coupling and cancellation process is shown. While the self-FEXT cross-couples to the victim user through the FEXT channel, the precoder or canceller performs the cancellation of the self-FEXT through a one-tap complex precoder or one-tap complex canceller by subtracting an estimate of the self-FEXT signal of the disturber from the transmit or received signal of the victim. FIG. 6 shows as an example the points of the constellation that will be considered for the partial cancellation process, in particular, those lying outside of the defined circle 652. As a result of the partial self-FEXT cancellation process, some residual self-FEXT signal will remain on the victim line. The amount of residual self-FEXT signal is proportional to the radius of the input signal considered for the partial cancellation process. As illustrated in FIG. 7, the decision boundaries used to determine whether to utilize the disturber input for the partial cancellation process can be embodied as any number of shapes, including but not limited to a circle, a square, a rectangle, or a star, or other defined decision boundaries. The decision boundary is applied to the x-axis and y-axis of the input constellation, or any other more complex decision boundaries. It should be emphasized that the threshold to be determined can be different along the x and y-axis of the input constellation. However, the symmetry of the disturber constellation suggests that the same threshold should be applied along the x and y-axis.

Figure 8:
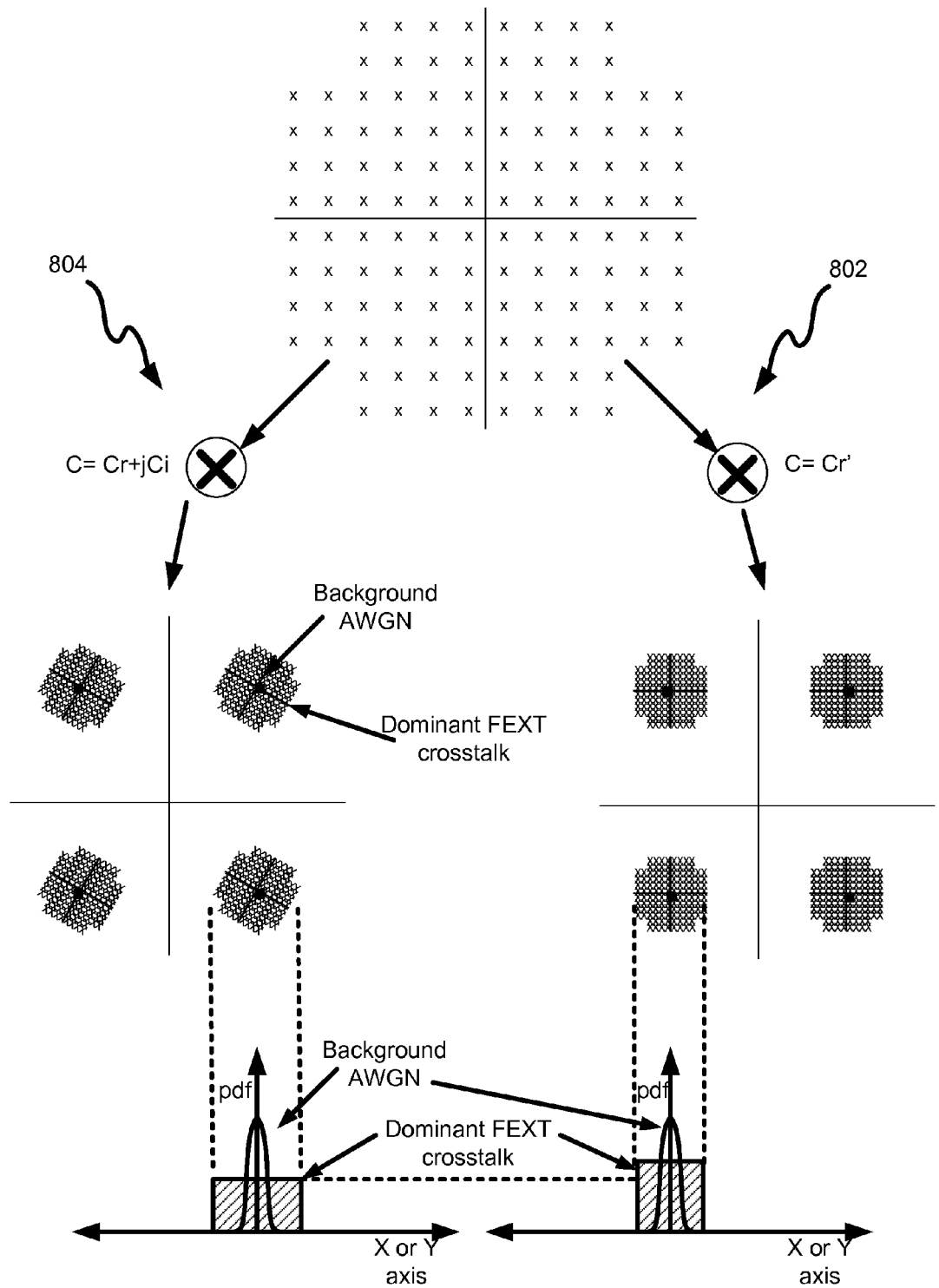
FIG. 8 illustrates the projection of the self-FEXT of one disturber through two cross coupling different channels with the same amplitude, but of different phase.

FIG. 8 illustrates the projection of the self-FEXT of one disturber through two different cross coupling channels of same amplitude, but of different phase. One channel 802 does not induce a rotation of the disturber, while another channel 804 induces a clockwise rotation of π/4. The distribution in the x and y directions of the error induced by the presence of the self-FEXT on the victim user are illustrated respectively for the two channels 802, 804, compared to the distribution of the same level of AWGN noise. The variance of the error induced by the self-FEXT will differ based on the rotation introduced by the crosstalk channel. As such, the threshold to be determined can take into account not only the magnitude of the attenuation of the crosstalk channel, but also the phase of the cross-coupling.

Figure 9:
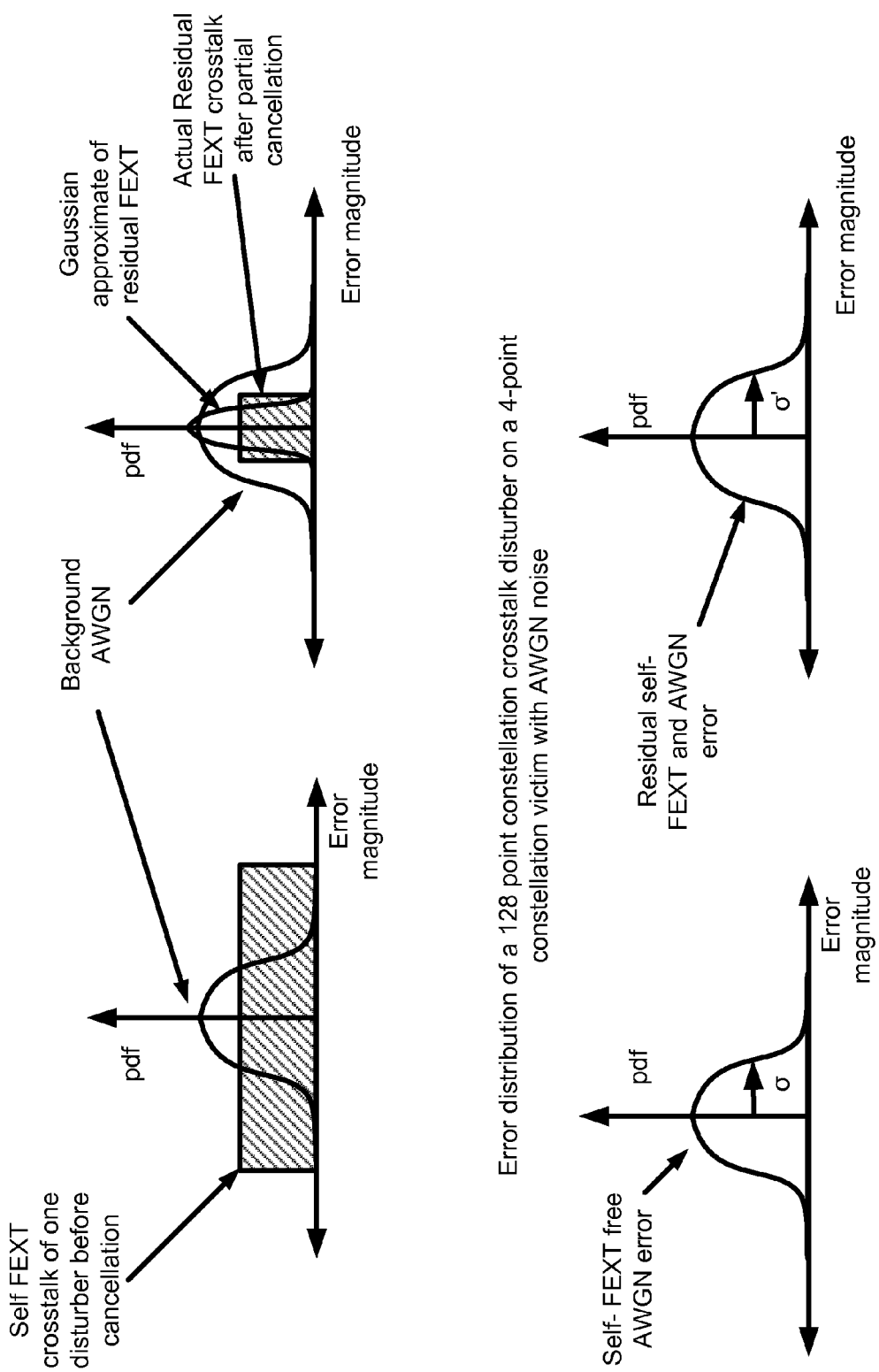
FIG. 9 illustrates the results of performing partial self-FEXT cancellation using the instantaneous level of the input signal to reduce the contribution of the self-FEXT to a level close to or less than that of the AWGN background noise.

As illustrated in FIG. 9, an objective of performing partial self-FEXT cancellation using the instantaneous level of the input signal is to reduce the contribution of the self-FEXT to a level close to or less than that of the AWGN background noise experienced by the victim user in a self-FEXT free environment. To the extent that the self-FEXT uniform distribution can be approximated by a Gaussian distribution, the distribution of the error signal after self-FEXT cancellation should be such that the variance $\sigma'^2 \geq \sigma^2$ is close to the variance of a self-FEXT free environment $\sigma^2$. For various embodiments, the determination of whether a particular constellation point input is utilized for the partial cancellation process comprises a comparison of the input constellation input signal along the x and y-axis against a set of predetermined thresholds, which are dependent on the relative amplitude of the real and imaginary dimensions of the self-FEXT crosstalk coupling coefficient. For some embodiments, the comparison is either preceded or followed by a comparison of the amplitude of the real and imaginary components of the input signals itself.

To further illustrate the concepts described, consider the following. First, let (X+jY) represent the complex input of the constellation point to the self-FEXT canceller for a given user, and let C=Cr+jCi represent the canceller coefficient that could be potentially multiplied to the input signal (X+jY). In accordance with various embodiments, a lower-complexity method may be implemented to select the disturber for cancellation based only on determining if the real precoded output Sr=(XCr−YCi) or the imaginary output component Si=(XCi+YCr) is below a certain threshold. Consider the following scenarios. First, suppose X>>Y, and Cr>>Ci. In this case, Sr=(XCr−YCi)~=XCr>>Si=(XCi+YCr), and the relative amplitude of X with respect to Cr could be solely used to determine whether or not to consider the particular input signal.

On the other hand, if X>>Y, and Cr=Ci, then Sr=(XCr−YCi)~=XCr~=Si=(XCi+YCr)~=XCi. Here, the relative amplitude of X with respect to Max (Cr, Ci) could be used to determine whether or not to consider the input signal. Finally, if X>>Y, and Cr<<Ci, then Sr=(XCr−YCi)<<Si=(XCi+YCr)~=XCi. In this case, the relative amplitude of X with respect to Ci could be solely used to determine whether or not to consider the input signal. A corresponding set of results can be similarly achieved if X<<Y. The methods above are generally easy to implement since the comparison of the magnitudes of the real and imaginary components typically involves determining the position of the most significant bits in the fixed point representation of the values. Different decision processes can be implemented in various embodiments.

The threshold described earlier used for the consideration of the input signal level in the FEXT cancellation process may be associated with the energy of the input signal, and can therefore be applied as a radius on the constellation input signal. Constellation points that lie within this radius (i.e., below the threshold 652) would not be considered as an input to the FEXT cancellation process, while those lying outside of the radius would be considered for the FEXT cancellation process. Note that for some embodiments, the threshold can be different with respect to the x-axis and the y-axis of the input constellation. For some embodiments, the precoder and/or canceller may be embodied as a one-tap complex multiplier. Accordingly, such embodiments may incorporate an alternative symbol selection process, which involves a comparison of the relative real and imaginary component amplitudes of the received constellation point, knowing the relative amplitude (and possibly sign) of the real component (cr) and imaginary component (ci) of the canceller coefficient.

Various approaches for determining the threshold are now described. One approach considers the relative level of the residual self-FEXT left after performing partial FEXT cancellation with respect to the amplitude of the background noise component affecting the victim user at that particular frequency. The background noise affecting the victim user is assumed to be Gaussian noise, while the residual self-FEXT is a stochastic process that is determined by the known self-FEXT coupling channel coefficient and the known input signal. The known input signal is limited to the constellation points falling within the boundaries defined by the threshold along the x-axis and y-axis.

While the resultant signal is not per se Gaussian since the resultant signal is the sum of a Gaussian signal and a uniformly distributed signal with limited support, the resultant signal can be approximated by a Gaussian signal, the variance of which is equal to the variance of the two signals. The derivation of the thresholds for the x and y inputs of the partial cancellation process should be determined such that the noise variance of the resulting signal falls below the variance needed along the x-axis and y-axis independently to satisfy a certain signal-to-noise ratio and bit error rate (BER) on the victim user constellation. Another approach for determining the threshold considers the probability density function (pdf) of the FEXT in each bin (or signal energy) due to the contributions of every disturber. The threshold is determined such that the combined self-FEXT falls below a certain level.

The following embodiment exemplifies the application of the partial cancellation technique described in order to achieve a reduction of the power consumption of the self-FEXT precoder, canceller multiplication operations. First, it should be noted that typical self FEXT signal levels will be 15 to 20 dB or more below the level of the signal of the victim seen at the receiver. The 99% FEXT coupling magnitude is given by the following:

$$C_{99\%}(f,d) = 1.59 \times 10^{-10} \times f\sqrt{d}$$

where f is the frequency in Hz and d is the loop length in meters.

As a nonlimiting example, assume that f=3 MHz and d=300 m. In this scenario, the probability that the magnitude of FEXT couplings will be lower than $8.26 \times 10^{-3}$ will be approximately 0.99. The following coupling matrix is taken from a 5 user system sharing a 300 m AWG26 bundle. The coupling dispersions are expressed in dB values with respect to the 99% worst case conditions. It illustrates how likely it is in practice to experience a FEXT coupling transfer function, which is well below the direct channel signal level.

$$D = \begin{bmatrix} 0 & 9.8 & 22.0 & 57.2 & 8.8 \\ 30.4 & 0 & 11.8 & 33.5 & 34.6 \\ 22.5 & 13.2 & 0 & 14.7 & 25.6 \\ 13.3 & 9.1 & 3.5 & 0 & 10.5 \\ 5.9 & 15.3 & 19.9 & 12.1 & 0 \end{bmatrix}$$

The relative weakness of the FEXT signal levels compared to the direct channel signal level of the victim user will yield coefficients of the precoder and canceller that are of relatively small magnitude since they multiply energy-normalized input signals. As such, for various embodiments, the complex precoder or canceller coefficient Cr+jCi will typically be coded with a pseudo-floating point format with 1 sign bit, E exponent bits and M mantissa bits. The determination of the E exponent bits will be such that the mantissa bits represents a normalized value in the interval [−1,1]. By doing so, the complex precoder or canceller coefficient Cr+jCi may be expressed as a product C'*(cr+jci) of a normalized complex value (cr+jci) and a real amplitude C'. In a fixed point two's-complement multiplication implementation, this product will typically be implemented as a shifter followed by a normalized complex multiplication. Since the self-FEXT channel and precoder or canceller value attenuates the disturber's signal (as compared to the direct channel victim signal), this shifter is a downshifting operation corresponding to an attenuation.

Reference is now made to FIG. 10A, which illustrates an implementation of a precoder or canceller unit, in which the coefficients stored in a pseudo floating point format are expanded into the real and imaginary value Cr+jCi in a two step process. This comprises extraction by a coefficient extractor 608 of the normalized coefficients (cr+jci), which are passed to the downshifters 601, 603 and downshifted by an amount equal to a number represented by the exponent, before being multiplied by the disturber QAM input data. The complex output of the complex multiplier 602 will be added or subtracted to the component of the victim direct channel via the rounders 605, 607 in order to compensate for the cross-coupling of the disturber signal into the victim. FIG. 10B depicts an embodiment where the normalized coefficients (cr+jci) are extracted from storage and presented to the multiplier 602 input, while the downshifters 601, 603 directly downshift the disturber input data by an amount equal to a number represented by the exponent before multiplication with the normalized coefficient. The output results are identical to those in FIG. 10A, where the coefficients are downshifted in place of the disturber's input data.

Note that the benefit of downshifting the input data rather than downshifting the coefficient is that the concept of discarding input data below a certain threshold, as described earlier, is automatically achieved with the downshift operation. As a result of the downshift operation, any data below a threshold associated with the exponent will be presented as zeros to the multiplier input. Various embodiments may comprise a multiplier with assisted hardware, which does not toggle internal registers and which would output a constant zero value whenever a zero input signal is presented as one of the operands and benefit from reduced power consumption. In other words, whenever the X+jY constellation input signal is below the threshold, the downshift operation will produce an X'+jY' input to the multiplier, with its real and, or imaginary part with no significant bits left.

Figure 12:
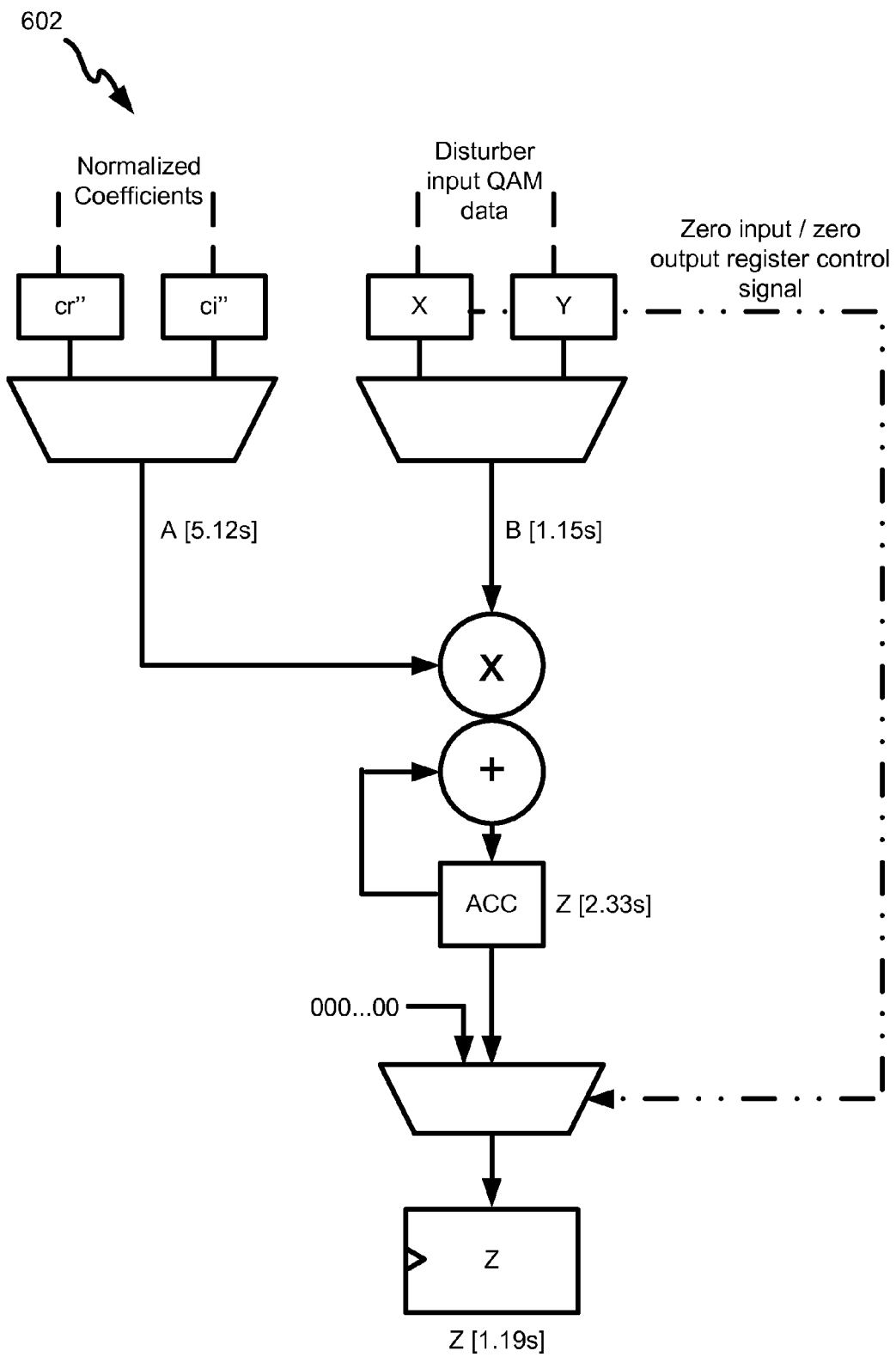
FIG. 12 shows one possible implementation of the complex multiplier shown in FIGS. 10A-B, 11A-C with added hardware circuitry that enables a zero output when both real and imaginary parts of the input data are zero.

A complex multiplier 602, which would output a constant zero value without toggling internal and external registers, when both X' and Y' input data are zero would conserve power in its operation and the combined downshift and complex multiplier would implement the input signal selection process that is exemplified in FIG. 6. Only the constellation points that fall outside of the gray shaded box, the boundaries of which are determined by the threshold, will be considered in the partial cancellation process. Reference is briefly made to FIG. 12, which shows one possible implementation of the complex multiplier with added hardware circuitry that enables a zero output when both real and imaginary parts of the input data are zero.

The various embodiments described take advantage of the relative level of the self-FEXT disturbers affecting a victim user. The coding of the self-FEXT coupling coefficient in a pseudo floating point format and the application of the corresponding exponent for a downshift of each input disturber data, which relates directly to the attenuation of the coupling between the given disturber and victim effectively allows a different threshold to be set for each disturber input data. This per-disturber threshold will in effect equalize the amount of residual self-FEXT induced by each disturber into the victim user, thereby achieving the goal of partial cancellation. The various embodiments described to this point primarily takes into account the relative amplitude of the couplings between all disturbers and the given victim, but does not consider explicitly the targeted residual FEXT noise level that is to be achieved on the victim user compared to the contribution level of the background noise. The embodiments now described take that aspect into account.

For some embodiments of the partial FEXT cancellation scheme, the amount of residual self-FEXT signal on the victim line that is not cancelled is determined by the lowest output signal value processed by the canceller or precoder. Based on this, only the input signal levels beyond a certain threshold for this partial cancellation process are considered since there is a direct relationship between the input and output signal levels in this one tap complex precoder, canceller operation. Discarding the output signal level that falls below a given value based on a relative level of the residual self-FEXT with respect to the background noise level on the victim user, equates to deciding the minimum signal level that should be considered at the input of the canceller or precoder for the partial cancellation process. As the minimum input signal level increases, the amount of residual FEXT increases as well. Therefore, achieving a residual FEXT energy level that is similar in energy to a higher background noise floor suggests setting the input threshold to a higher value. The use of a higher threshold in the architecture depicted in FIG. 10B corresponds to performing additional downshift to the input data using downshifters 701 and 703. However, the additional downshift of the input data should be compensated by an upshift of the coefficient or of the output data as illustrated in FIGS. 11A, 11B using the upshifters 711, 716.

The upshift compensation keeps the overall FEXT coupling coefficient magnitude identical regardless of the threshold selected for the selection of the input data based on the target SNR and desired residual self FEXT level on the victim user. Reference is made to FIG. 11C, which shows one implementation in which the original exponent bits used to represent the magnitude of the coupling coefficient are also being used for indicating the additional downshifting required as a function of the target residual FEXT level. Since the disturber input data is coded based on 16 bits, the maximum number of possible downshifts is limited to 16 (4 bits). However, the coefficient bus 726 is increased from 12 to 16 bits in order to allow for the storage of the complex precoder or canceller coefficient Cr+jCi in a format C''*(cr''+jci''), which consists of an exponent number including the additional downshift and a normalized complex value (cr"+jci") which can exceed the value of 1 in magnitude. The 16 bits coefficient bus 726 is aligned with the input of the multiplier in such a way that only the lower 12 bits are used whenever the number of additional downshifts sets by the target SNR/residual FEXT level is zero, thereby reverting to the embodiment shown earlier in FIG. 10B.

Figure 13A:
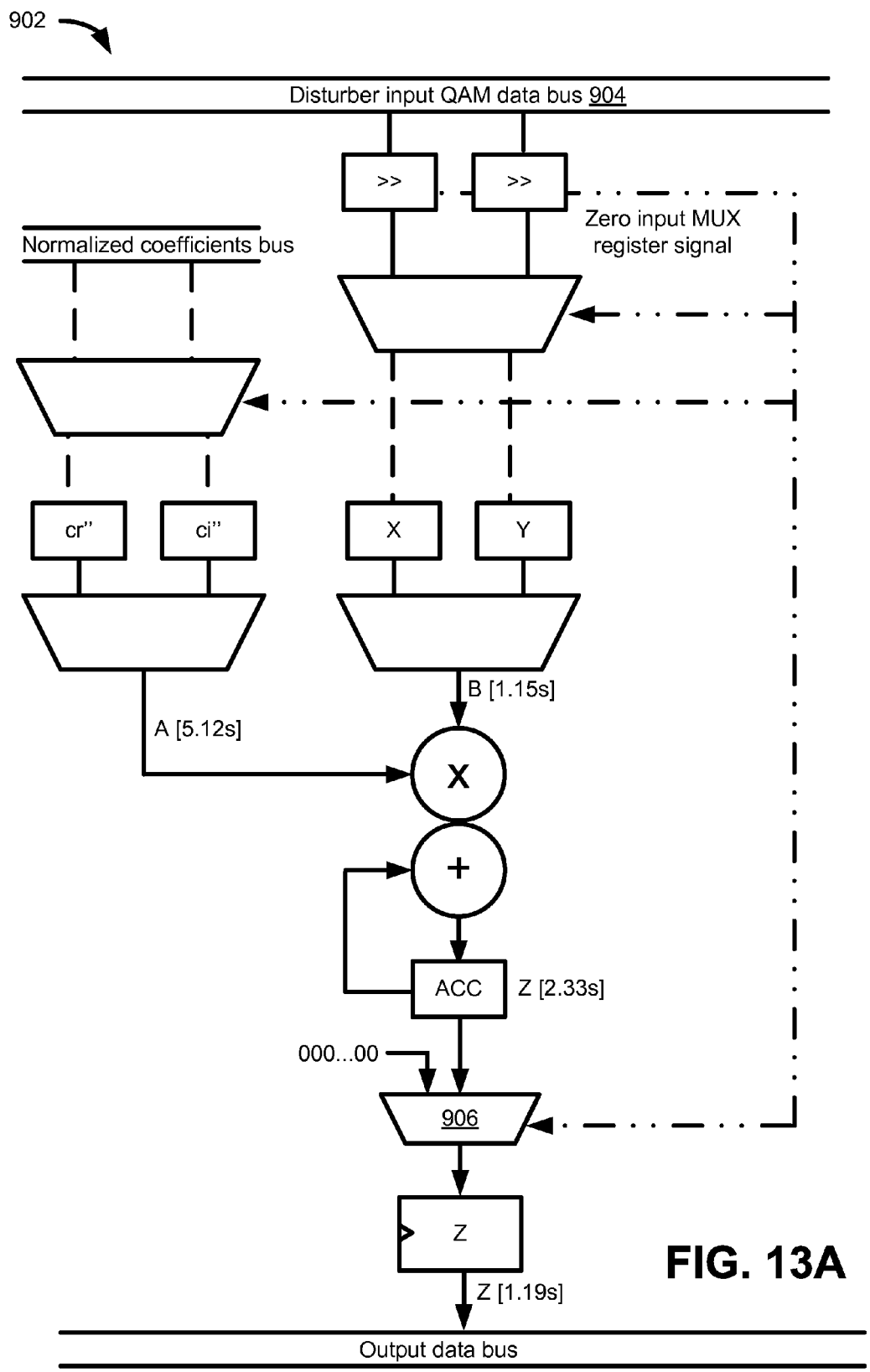
FIG. 13A illustrates one possible implementation of a multiplier circuit, which is being multiplexed between multiple disturbers' data input.

The following embodiment for partial FEXT cancellation achieves multiplexing of a set of given multiplier's resources among a greater number of disturbers. FIG. 13A illustrates one possible implementation of a multiplier circuit 902, which is multiplexed between multiple disturbers' data input. If the data being fetched from the data bus 904 and downshifted appropriately according to the threshold defined for the particular disturber yields an all zero value, the multiplexer 906 will discard the input and produce a zero output while fetching the next disturber/coefficient set to present at the multiplier input for computation. By allowing such dynamic multiplexing of multiple disturbers' input data to a common multiplier resource, better time utilization can be made of the multiplier resource.

The ability to benefit from time multiplexing the common resource presupposes that multiple input data can be presented to the multiplier 902 input in less than the time associated with one multiplication operation. As a nonlimiting example, if fifty percent of the disturbers' shifted input data is statistically zero across all disturbers for a given symbol, then a series of sets of input data and associated coefficients for multiple disturbers should be presented to the multiplier's unit, in case multiple consecutive shifted input data sets are all zeros.

Figure 13B:
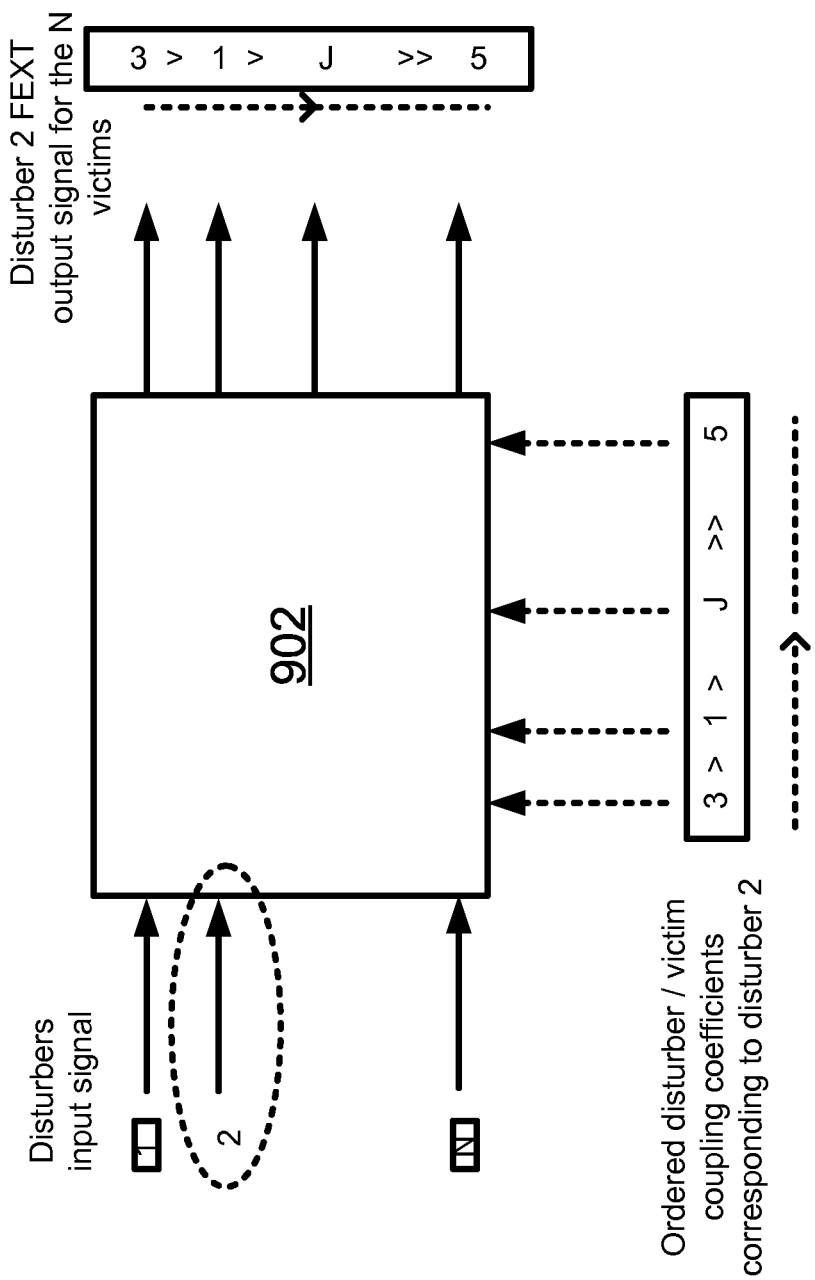
FIG. 13B illustrates an embodiment for ordering of the coupling coefficients of each individual disturber into multiple victim users.

FIG. 13B illustrates an embodiment for ordering of the coupling coefficients of each individual disturber into multiple victim users that can be envisioned to facilitate the exploitation of another input multiplexing concept. In FIG. 13B, the precoder/canceller computation process is presented with disturber input data to be multiplied together with the selected disturber victim coefficients, which represents the coupling between the selected disturber and all victims users. For some embodiments, the process is performed in such a way that the input data corresponding to one disturber on a given tone is presented to the multiplication resource and processed with all coupling coefficients associated with the impact of this disturber into all victim users, which have been ordered a priori based on the magnitude of the coupling coefficients.

As the same input data of one given disturber is being gradually shifted down, and as coupling coefficients associated with weaker coupling channels are being considered with more and more attenuation, the input data to the multiplier of FIG. 13A will appear as all zeros and the multiplication process can stop for all subsequent victim users since a certain level of attenuation is reached. At this point, other input data from another disturber can be taken into account for processing. This is illustrated in FIG. 13B where the disturber input data is presented sequentially from disturber 1 to disturber N. For each disturber data under consideration (e.g., disturber 2, which is circled in the figure), the associated pre-ordered coupling coefficients into the N−1 victim users are fetched consecutively. As shown, the coupling of disturber 2 into victim user 3 has the biggest amplitude of all coupling into any victims. This is followed by the coupling of disturber 2 into victim user 1, and then victim user J, thereby producing an ordered set of disturber/victim coupling coefficients corresponding to disturber 2.

For this nonlimiting example, the coupling into victim user 5 has the smallest amplitude of all coupling of disturber 2 into any victims. For any input signal level of disturber 2, the downshifting associated with the coefficient of user 5 will be more than the one associated with user J, which is greater than the one associated with user 1 or even user 3. However, for a given instantaneous input signal level of disturber 2, the amount of downshifting associated with a particular victim user may produce a zero input to the multiplier's inputs, as illustrated on FIG. 13B for user J. Therefore, it should be emphasized that the processing of this given input signal for victim J can be avoided, together with the processing for all victim users that follow J in the ordering process associated with disturber 2.

Once this stage is reached, the processing of the instantaneous signal of disturber 3 and the pre-fetching of the preordered coupling coefficients of this disturber into all victims may be performed. It should be noted that such embodiments of the partial cancellation scheme provide both processing power conservation and resource sharing benefits. Note also that the ordering can either follow the relative value of the downshifter or threshold associated with the coupling of the FEXT channel only, or in other embodiments, the ordering can follow the relative value of the downshifter or threshold associated with the coupling of the FEXT channel together with the targeted SNR or residual FEXT associated to each victim user.

The benefits of power conservation and resource sharing can be achieved by performing the ordering process according to the relative value of the threshold associated with the impact of the disturber under consideration into the various victim users. In general, multiplexing the input to the multiplier based on a threshold associated with the input data either reduces the amount of multiplication for a given set of disturbers, or results in a greater number of multiplications in a given time slot in order to achieve a greater number of disturber/victim precoding or cancellation processes. In this nonlimiting example, a simple ordering of the coefficients of a given disturber into all victim users can be easily implemented in order to reduce the computation time associated with the multiplication of the impact of the given disturber into all victims. In addition to conserving power, ordering allows one to lump together the idle time of the multiplier spent on computing the negligible impact of one disturber into given victims, and bypass this computation. In addition to saving time, the described embodiments also reduce the movement associated with coefficient fetches and other internal data transfers.

Some embodiments of partial FEXT cancellation may be implemented such that a reduction of the data transfer between entities of the self-FEXT precoder and canceller architecture may be achieved. Note that with the previous embodiments described, an internal reduction in the data transfer in the self-FEXT precoder or canceller can also be realized, thereby reducing data bandwidth requirements. With reference back to FIG. 13B, the computed FEXT component of the disturber 2 for ordered victim users J and below does not need to be added to the partial FEXT cancellation accumulation associated with each victim user, thereby reducing internal data transfer. Also, the coefficient fetch operation following victim j for the disturber 2 in the preordered coefficient tables is not necessary, since the corresponding FEXT components of disturber 2 into the victims following victim j will not be processed, thereby also limiting some internal data transfer.

Figure 14A:
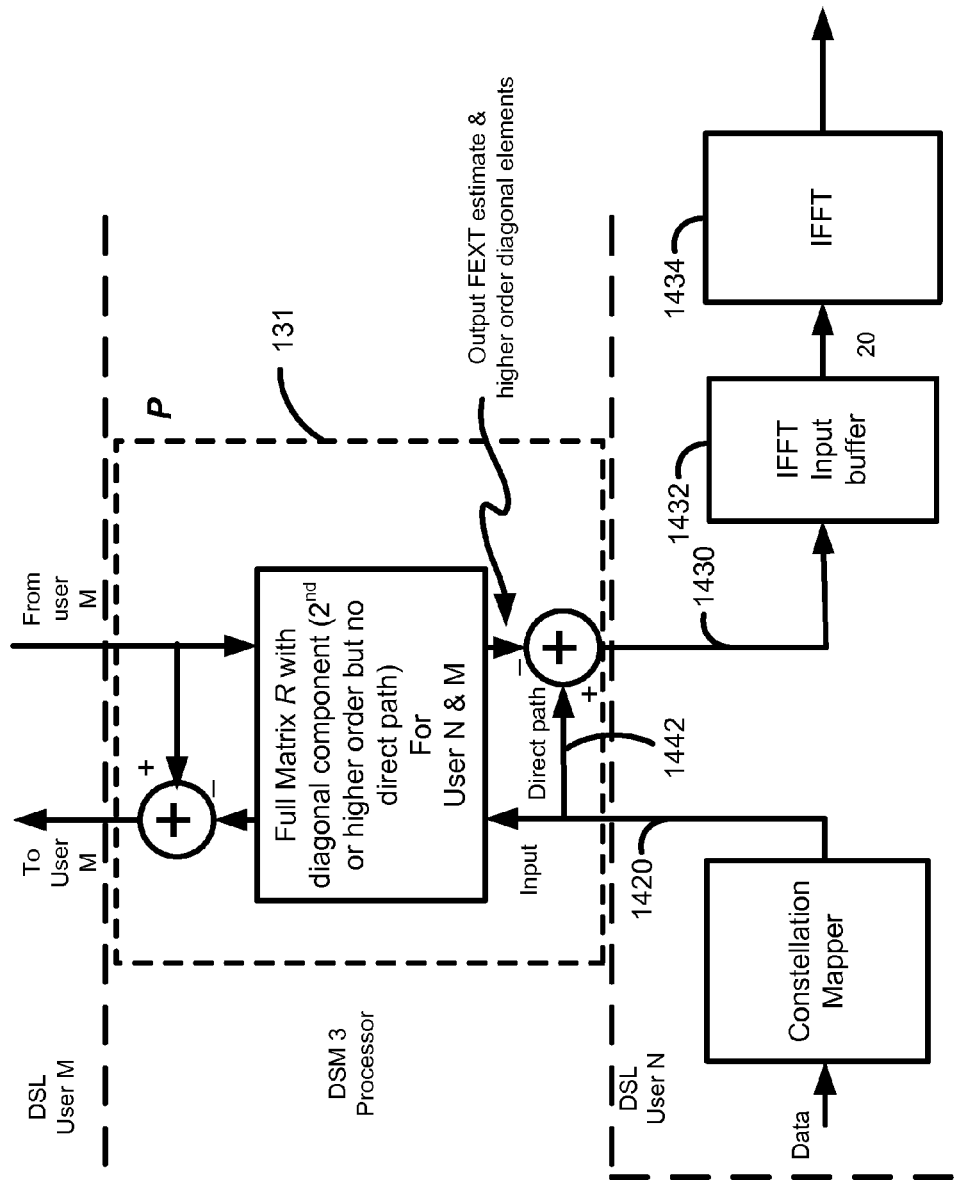
FIG. 14A shows the general architecture of a precoder and the associated interface to the DSL PHY device of two DSL users N and M.
Figure 14B:
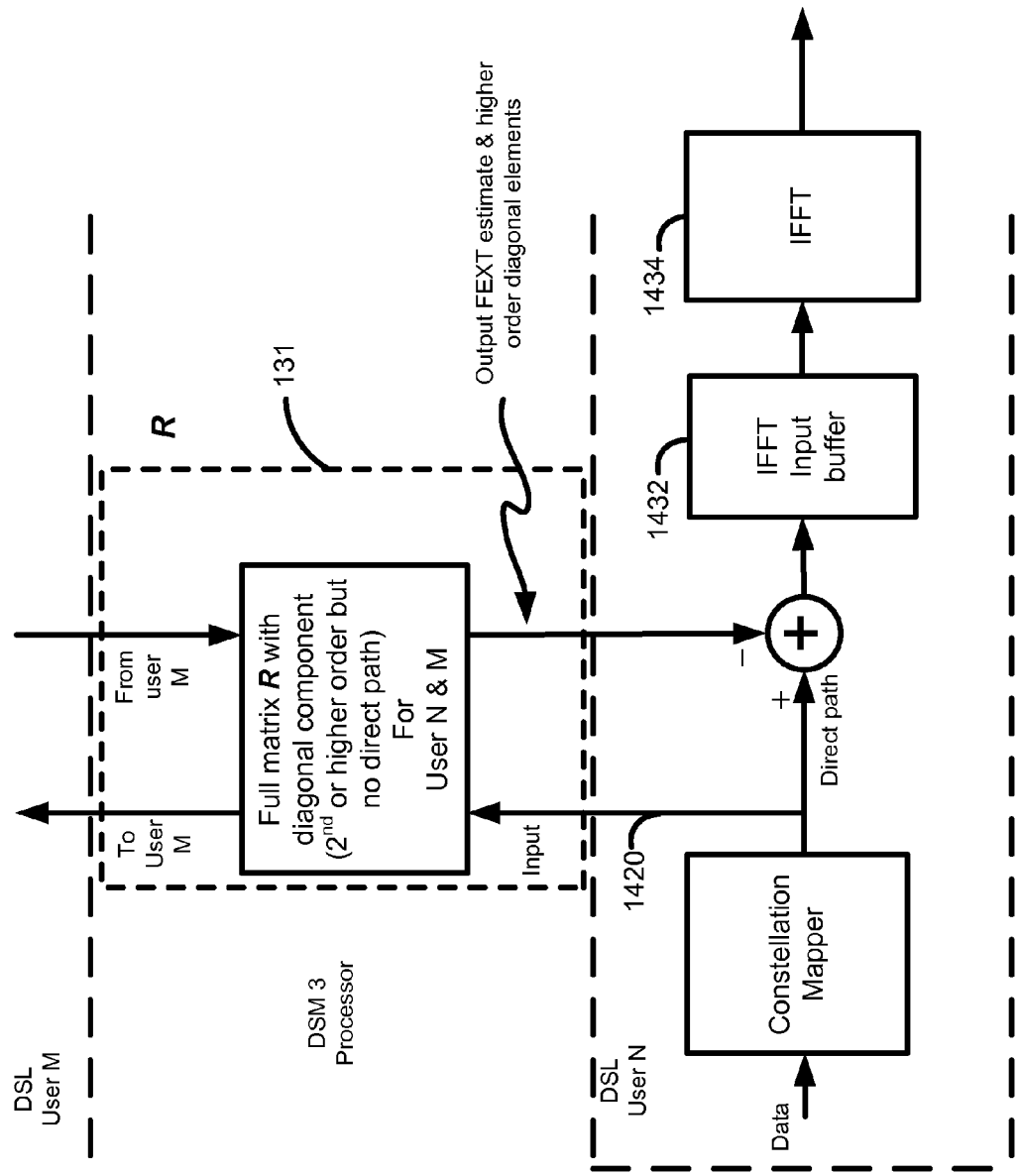
FIG. 14B illustrates how a reduction in bandwidth can be realized on a self-FEXT precoder architecture, referred to as the off-diagonal precoder architecture.

Furthermore, a reduction in bandwidth can be realized on a self-FEXT precoder and canceller architecture, referred to as the off-diagonal architecture detailed in FIG. 14B and FIG. 14D. In FIG. 14A, the general architecture of a precoder and the associated interface to the DSL PHY device of two DSL users N and M is shown. For some embodiments of an off-diagonal precoder, the existence of a direct path for transmitting the data of DSL User N, as well as the existence of a non-direct path, which primarily consists in the FEXT estimate from all other users (User M), should be noted. The two elements are combined and transmitted on the line, but the actual partitioning of the processing is done as follows. As illustrated in FIG. 14A, the DSL User N performs the constellation mapping and gain scaling of the User N data with full precision. The data of User N is transferred across interface 1420 to the DSM3 processor 131 for precoding. The precoding comprises two parts: first it derives from the user N input data an estimate of the FEXT component from user N into user M. This estimate will then be subtracted from the signal of user M and passed on to the IFFT 1434 of user M. The user N input data also receives an estimate for the FEXT from user M. The processed direct path data of user N combined with the FEXT estimate of the other users is then passed to the IFFT for transmission on the line of user N. FIG. 14A illustrates this process, whereby the direct path element 1442 of user N is combined with the user M FEXT estimate and higher order diagonal elements of the direct channel in the DSM3 processor before being presented across the interface 1430 to the IFFT input buffer 1432.

FIG. 14B illustrates an alternative to this precoder architecture in which the combining operation of the direct path and of the FEXT estimate is performed on the DSL PHY and not on the DSM3 processor. Such embodiments of partial cancellation based on the instantaneous amplitude of the input signal and multiplexing of a common resource are directed to reducing bandwidth usage on the interface 1420 between the different entities of the DSM3 precoding process. Whenever input data to the DSM3 precoder falls below a certain threshold associated with the expected residual self-FEXT, that input data is not transferred to the precoder. Note that this application to the downstream precoder example of FIGS. 14A, 14B can be extended to the upstream canceller architecture as well. Such canceller architectures are illustrated in FIG. 14C and FIG. 14D.

Figure 14C:
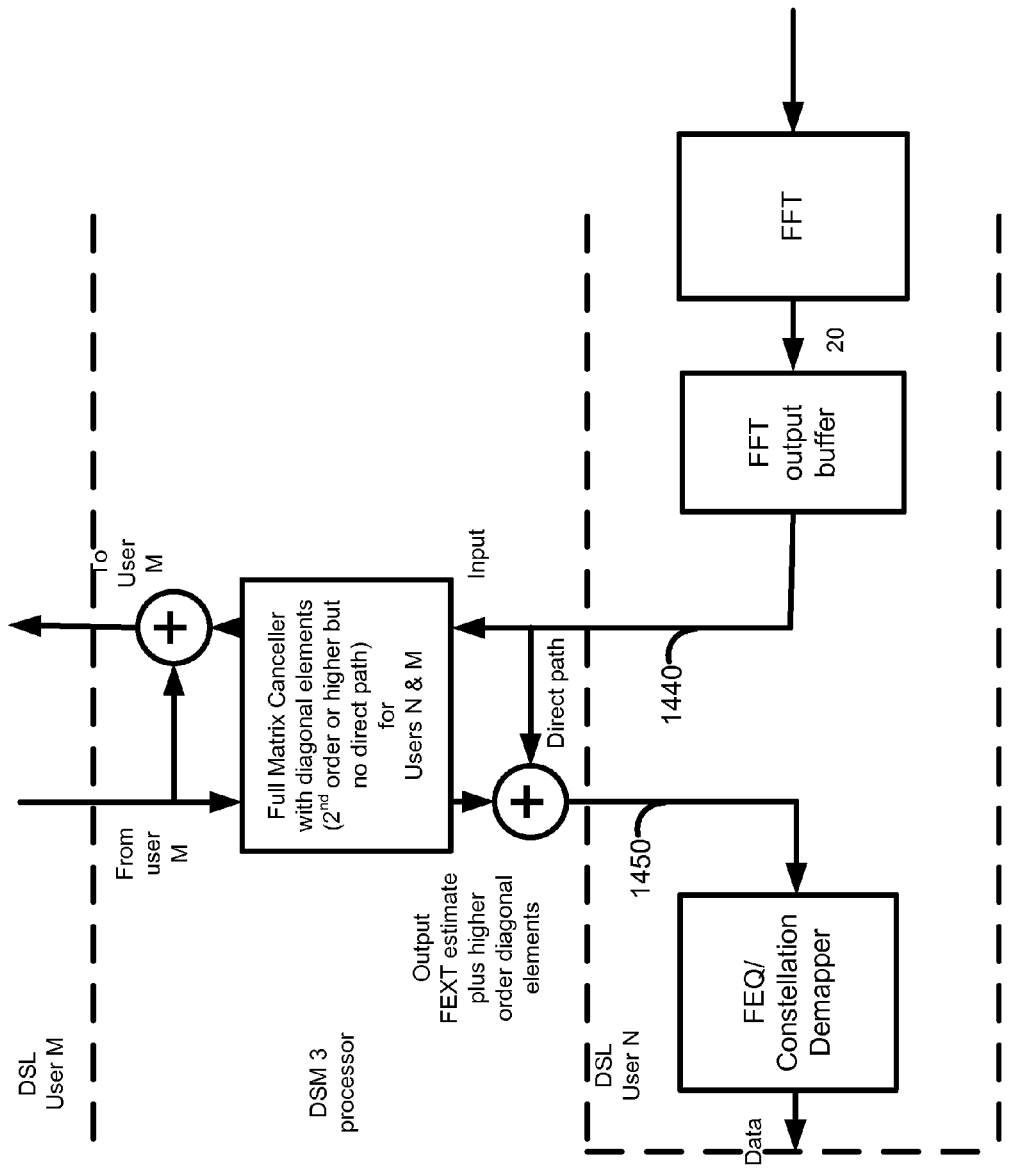
FIG. 14C shows the general architecture of an upstream canceller and the associated interface to the DSL PHY device of two DSL users N and M.

In FIG. 14C, the direct path of DSL user N is transferred on interface 1440 to the DSM3 processor 131 where it is recombined with the FEXT output estimate of user M on the DSM3 canceller processor before being transported back across the DSM3 processor, DSL PHY user N interface 1450. FIG. 14D shows an embodiment of an off-diagonal differentiated architecture in which the direct path component of user N is recombined with the FEXT output estimate of user M on the DSL PHY layer and not on the DSM3 processor. Such architecture allows for the reduction of bandwidth at the interface 1440 between the DSL PHY and DSM3 processor in case the input data of DSL user N at the output of FFT output buffer of user N falls below a certain threshold associated with the expected residual self-FEXT of user N into user M. If the output of the FFT output buffer for a given tone falls below this predetermined threshold, the data is not transported to the DSM3 processor, thereby reducing the bandwidth at the interface.

For embodiments of partial cancellation in a precoder or canceller architecture, the determination of the threshold associated to each disturber input is explained in this section. For various embodiments, two models may be implemented. The first model considers the relative level of the overall residual self-FEXT induced after partial cancellation with respect to the amplitude of the background noise component affecting the victim user at that particular frequency. The fact that the background noise affecting the victim user is Gaussian noise is considered, while the residual self FEXT is a stochastic process, which is completely determined by the known self-FEXT coupling channel coefficient and the known input signal, which is limited to the constellation points falling within the boundaries defined by the threshold along the x and y-axis. The resultant signal is not per se Gaussian, since it is the sum of a Gaussian signal and a uniformly distributed signal with limited support. However, it can be approximated by a Gaussian signal, of which the variance is equal to the sum of the variances of the two signals. The derivation of the thresholds for the x and y inputs of the partial cancellation process should be determined such that the noise variance of the resulting signal falls below the variance needed along the x-axis and y-axis independently or jointly to satisfy a certain SNR and BER on the victim user constellation. In the following, the threshold for the x-axis and y-axis is derived. Note that the method presented can be applied separately or concurrently to the x and y-axis components of the crosstalk.

An objective of partial FEXT cancellation is to achieve the maximum rate possible based on the resources available (complexity, power, etc.). As discussed earlier with respect to conventional approaches, one way to achieve high rates is by performing offline preprocessing and ordering of the coupling across all the tones for a given victim and to process only a subset of the coupling disturbers, so ordered, for the partial cancellation. However, this scheme does not consider the variation of the instantaneous transmit symbol energy, which can vary significantly (up to 42 dB) in large QAM constellations. Thus, a more optimal ordering for partial cancellation involves processing of the crosstalk energy from various disturbers induced on a victim on all the tones and ordering them for cancellation at every single DMT symbol. Instantaneous line ordering and tone ordering can be applied on a DMT symbol basis. An even more optimal implementation involves joint line and tone ordering being performed based on the instantaneous crosstalk energy from the various disturbers to a victim across all the tones. Other embodiments for ordering based on the instantaneous energies are also possible.

This ordering, however, potentially involves enormous on-line computations, thereby defeating the purpose of performing partial cancellation. As such, various embodiments factor this in and combine offline ordering with minimal online computation and thus gain in either rate (for same computational complexity) or reduction in computations (for a given rate). This is done by fixing a threshold for each victim at every tone, such that it discards the input data below it. The various embodiments may either threshold the FEXT induced by a victim on a disturber or threshold the input signal energy of the disturber for a particular victim before it is processed. It should be emphasized again that separate thresholds for all the disturbers on each tone may be incorporated. Determining the threshold involves the consideration of various factors, including the average input signal energy (i.e., the average energy of the transmitted symbol in the downstream direction and the average energy of the received symbol in the upstream direction), crosstalk coupling between the victim and a disturber, and the target SNR that is to be achieved using the partial cancellation scheme. The actual value of the target SNR or residual noise level can be determined by other factors, as will be described later.

Two schemes are now described for determining the threshold on any one tone for any victim. In the first scheme, the input estimate of the crosstalk for all the disturbers is compared to a common threshold, and crosstalk energy less than the threshold is not processed further for cancellation or for precoding purposes. Note that for various embodiments, this threshold is same for all the disturbers' impact on a given victim for a particular tone. However, for other embodiments, different thresholds may be implemented as well. The crosstalk energy is the product of the coupling magnitude and the input signal level. The thresholds in this scheme are obtained such that the residual FEXT achieves the target SNR from a statistical standpoint.

In the embodiment described below, the derivation of the threshold for real and imaginary part are considered separately. Further, it is assumed that the crosstalk energy from a given victim to a user is continuous and of a uniform pdf in any of the two directions considered separately. However, the crosstalk energy might not be uniformly distributed in many QAM constellations. The method presented below will still be applicable for non-uniform pdf of the crosstalk. Moreover, a single common threshold for both the x and y directions can also be computed with the method presented. The embodiment presented below serves only as an example of the method used to determine the threshold and in no way limits it.

Consider a real coupling coefficient between all disturbers and the victim and an input variation along the X axis of the constellation. Accordingly, all residual FEXT signal will project itself along the x axis of the victim constellation. Assume that the common crosstalk energy threshold along the X direction for all the vectored users on a tone is represented by $\epsilon_{th}$. Let the total number of disturbers be N. Also, for the i'th disturber let the maximum crosstalk energy is given $\epsilon_i^{max}$ and minimum crosstalk energy (corresponding to the nearest symbol to the origin) is given by $\epsilon_i^{min}$. The expected value of the residual FEXT energy given the threshold $\epsilon_{th}$ on a victim by disturber index i is given by:

$$E\{\text{residual\_FEXT\_disturber\_i}\} = \frac{(\varepsilon_{th}^2 - (\varepsilon_i^{min})^2)}{2(\varepsilon_i^{max} - \varepsilon_i^{min})}$$

where E denotes the expectation operator. Thus, the total residual FEXT for a victim induced by all the disturbers post partial cancellation is:

$$E\{\text{residual\_FEXT\_on\_victim}\} = \sum_{i=1}^{N} \frac{(\varepsilon_{th}^2 - (\varepsilon_i^{min})^2)}{2(\varepsilon_i^{max} - \varepsilon_i^{min})}$$

Let the targeted noise level for the victim be $\sigma^2_{tar}$, then by the previous equation, the following equation is derived:

$$\sum_{i=1}^{N} \frac{(\varepsilon_{th}^2 - (\varepsilon_i^{min})^2)}{2(\varepsilon_i^{max} - \varepsilon_i^{min})} = \sigma^2_{tar}.$$

For large constellations, it can be assumed that $\epsilon_i^{max} - \epsilon_i^{min} \approx \epsilon_i^{max}$ and $\epsilon_i^{min} \approx 0$. Based on this, the following expression may be derived:

$$(\varepsilon_{th})^2 = \frac{2\sigma^2_{tar}}{\sum_{i=1}^{i=N} \frac{1}{\varepsilon_i^{max}}}$$

Assuming that the maximum constellation energy $\lambda_{imax}$ is same for all the constellation sizes, this leads to $\epsilon_i^{max} = \lambda_{imax}|c_i|^2$. The equation above can then be rewritten as:

$$(\varepsilon_{th})^2 = \frac{2\sigma^2_{tar}\lambda_{max}}{\sum_{i=1}^{i=N} \frac{1}{|c_i|^2}}$$

Note that, $\epsilon_{th}$ is a threshold to be applied on the individual crosstalk energy of the various disturbers that impact the victim user. To report this threshold to each disturber's input signal, the coupling needs to be factored into the above equation.

Similar analysis can be done for the Y direction as well. The equation above for the derivation of the threshold is based on the residual FEXT energy of all disturbers into the victim user. Similar derivation of the threshold based on only the signal energy of the disturber can also be obtained, in case the coupling between disturbers and victim are unknown or considered identical. The method described above for using a threshold achieves a target SNR which can be set to any desired value.

Note that for some embodiments, the concept of using a common threshold can be expanded to incorporate individualized thresholds for each disturber for a given victim. In this case, the target noise energy $(\sigma^2)^i_{tar}$ for each disturber post partial crosstalk cancellation is decided such that the sum total of noise energy of all the disturbers is $\sigma^2_{tar}$, that is $$\sum_{i=1}^{i=N} (\sigma^2)^i_{tar} = \sigma^2_{tar}.$$

The individual disturber residual target FEXT post partial cancellation is given by $(\sigma^2)^i_{tar}$:

$$(\sigma^2)^i_{tar} = E\{\text{residual\_FEXT\_disturber\_i}\} = \frac{(\varepsilon_{th}^2 - (\varepsilon_i^{min})^2)}{2(\varepsilon_i^{max} - \varepsilon_i^{min})}$$

For such embodiments, the thresholds are kept separate for each disturber. One example of such embodiment would be when the individual target residual FEXT is equal for all the disturbers for a particular victim and hence, for N disturbers, $$(\sigma^2)^i_{tar} = \frac{\sigma^2_{tar}}{N}.$$

The equation above can now be applied to obtain an individual threshold. $(\epsilon^2)^i_{th}$ using the expectation method as outlined above. In this case, the individual thresholds for each disturber relate to the common threshold derived at the output of the canceller by the coupling coefficient associated with each disturber.

Some embodiments employ the partial FEXT cancellation techniques described to achieve a reduction in power consumption of the self-FEXT precoder, canceller, multiplication operations. Other embodiments focus on achieving a multiplexing of a set of given multiplier's resources among a greater number of disturbers. Yet other embodiments are directed to applying the partial FEXT cancellation techniques described to reduce the data transfer between entities within the self-FEXT precoder and canceller architecture. For example, this bandwidth reduction can be realized on a self-FEXT precoder and canceller architecture, of the type referred to as an off-diagonal architecture or "differentiated architecture," as described earlier in more detail.

Reference is made back to FIG. 2, which illustrates a DSL system in which the various embodiments described herein for performing instantaneous self-FEXT cancellation may be implemented. In accordance with some embodiments, the system 200 may comprise a DMT-based VDSL (Very High Bitrate DSL) system. As depicted in FIG. 2, the system 200 includes N sets of CPE (customer premises equipment) or users 210a, 210b, 210c. The system 200 further comprises a FEXT mitigator 137 for performing self-FEXT cancellation. The FEXT mitigator 137 comprises a computation unit 131 for mitigating FEXT associated with the downstream direction, wherein for some embodiments, the computation unit 131 may be implemented as a MIMO (multiple-input/multiple-output) precoder, whereas for mitigating FEXT associated with the upstream direction, the computation unit 131 may comprise a MIMO canceller. The computation unit 131 is tightly coupled with the upstream (US) and downstream (DS) vectorized PMD layer of each CO DSL transceivers 240a, 240b, 240c. The FEXT mitigator 137 further comprises a self-FEXT cancellation control unit 132 that controls the computation unit 131. The control unit 132 comprises an estimator 135 that monitors the instantaneous characteristics of a given disturber. The control unit 132 further comprises a selector 139 for selecting disturbers to cancel according to a threshold. The FEXT mitigator 137 may further comprise a canceller to address noise from external sources. The CO 230 may also include an xDSL access multiplexer (DSLAM), PHY layer devices 240a, 240b, 240c, and other equipment for interfacing with users 240a, 240b, 240c.

As described earlier, the average transmit power of all vectored users (both the disturber and victim) is typically the same since all users generally operate under the same power spectral density (PSD) specifications. As such, conventional approaches have focused on determining which disturber FEXT to cancel and which disturbers not to cancel on a given victim based on the FEXT coupling, which is assumed to be slowly varying with time and hence deterministic. With conventional approaches, this approach is generally referred to as line selection. Vectored VDSL systems with signal cooperation at the CO are a relatively recent development in the field. Given a limited amount of computing and storage resources, current approaches focus on tone selection for optimizing the tones to perform FEXT mitigation and/or line selection for determining the number of disturbers to cancel on each tone. In this regard, while conventional approaches involving line selection focus on performing partial cancellation decisions based on coupling values, they fail to focus on instantaneous symbol energy criteria. When viewed at the instantaneous DMT symbol-to-DMT symbol level, the self-FEXT noise injected from the disturber into the victim is dependent on the instantaneous transmit power on the disturber, which can vary widely from one symbol to another if the transmission constellations are large.

Often in vectored VDSL systems, the efficient allocation of computational resources aids in the optimization of the data rate for various vectored users. One allocation scheme involves off-line joint line and tone selection, where all the resources are divided among all the tones for a victim based on only the coupling between disturbers and the victim. One embodiment of the instantaneous partial cancellation is based on the computation of a threshold such that the total expected multiplication on a given tone for partial cancellation is equal to the allocated number using the above off-line computation (based on line selection, tone selection and/or joint line and tone selection). This threshold can be determined in a similar fashion as the threshold determination based on the residual FEXT available at each tone (as described earlier).

Various embodiments are directed to dynamic allocation of resources to perform per-tone FEXT mitigation, which may comprise precoding or FEXT cancellation. In particular, various embodiments are directed to a DSM3 FEXT cancellation system 200, where the estimator 135 takes into consideration the instantaneous energy and/or amplitude level of the FEXT disturber input signal, and specifically, the position of the constellation point transmitted or received on the disturber constellation. The control unit 132 performs controls of the FEXT cancellation unit 131 based on a predetermined threshold in accordance with the techniques described earlier.

A per-DMT symbol based selection process is incorporated whereby the selector 139 determines which disturbers to cancel for a given tone by evaluating the instantaneous input signal amplitude/energy level in addition to the amplitude (and for some embodiments, the sign) of the real and imaginary components of the FEXT coupling matrix and/or precoder/canceller coefficient. Furthermore, the various embodiments of FEXT cancellation are implemented in a system 200 comprising a DSM3 processor 131 and DSL physical (PHY) layer devices 240a, 240b, 240c that leverages the reduction in precision of data being exchanged between the two devices, thereby reducing the bandwidth on their respective interfaces. Even if reference is made to a CO centric self-FEXT cancellation embodiment in FIG. 2, in general, and irrespective of whether FEXT mitigation is performed at the CO 430 or CPE 440a, 440b, 440c, the various embodiments for partial self-FEXT mitigation for a given direction of operation (e.g., upstream vs. downstream) may be implemented either at the CO 230 or the CPE 210a, 210b, 210c.

Figure 15:
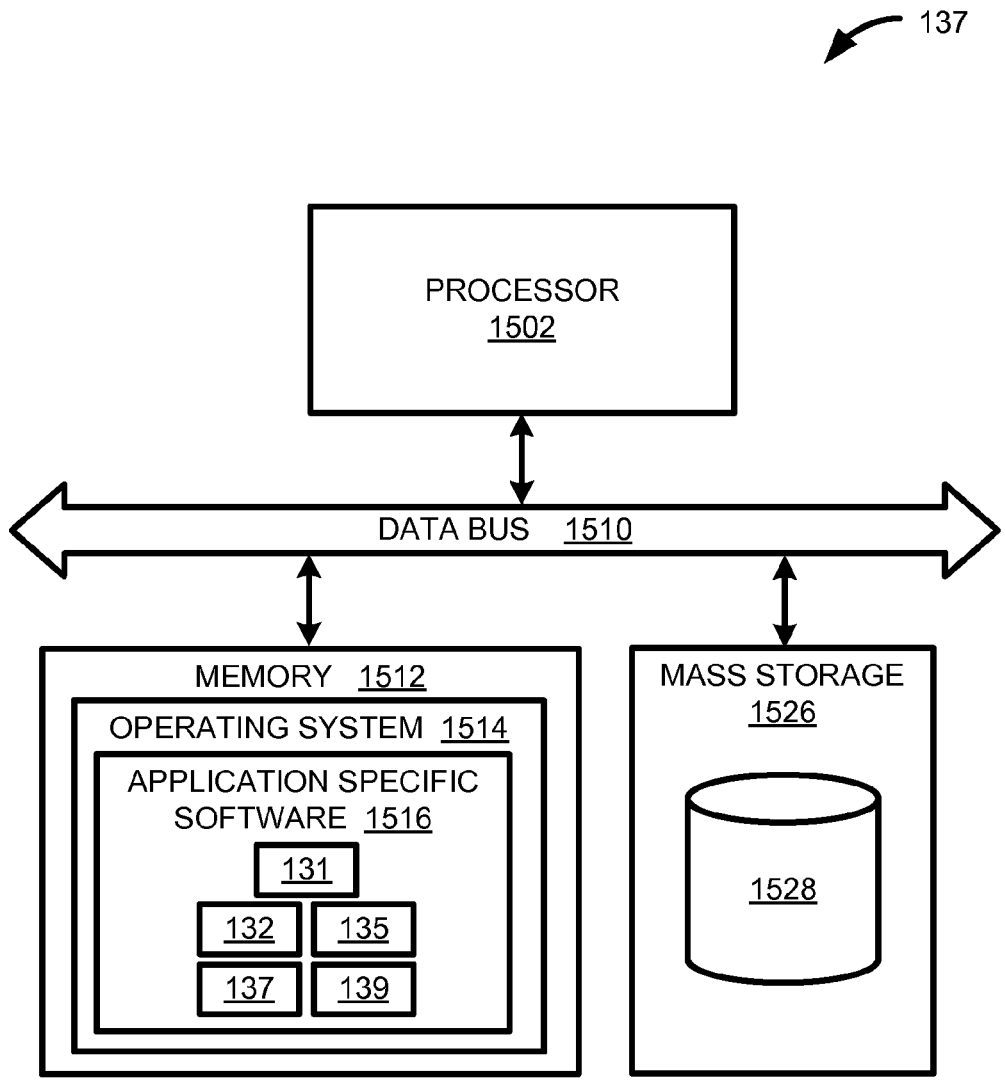
FIG. 15 illustrates an embodiment of an apparatus for executing the various components shown in FIG. 2.

FIG. 15 illustrates an embodiment of an apparatus for executing the various components shown in FIG. 2. Generally speaking, the various embodiments for performing partial self-FEXT cancellation may be implemented in any one of a number of computing devices. Irrespective of its specific arrangement, the FEXT mitigator 137 in FIG. 2 may comprise memory 1512, a processor 1502, and mass storage 1526, wherein each of these devices are connected across a data bus 1510.

The processor 1502 may include any custom made or commercially available processor, a central processing unit (CPU) or an auxiliary processor among several processors associated with the FEXT mitigator 137, a semiconductor based microprocessor (in the form of a microchip), one or more application specific integrated circuits (ASICs), a plurality of suitably configured digital logic gates, and other well known electrical configurations comprising discrete elements both individually and in various combinations to coordinate the overall operation of the computing system.

The memory 1512 can include any one or a combination of volatile memory elements (e.g., random-access memory (RAM, such as DRAM, and SRAM, etc.)) and nonvolatile memory elements (e.g., ROM, hard drive, CDROM, etc.).

The memory 1512 typically comprises a native operating system 1514, one or more native applications, emulation systems, or emulated applications for any of a variety of operating systems and/or emulated hardware platforms, emulated operating systems, etc. For example, the applications may include application specific software 1516 stored on a computer readable medium and executed by the processor 1502 and may include any of the modules 137, 131, 132, 135, 139 described with respect to FIG. 2. One of ordinary skill in the art will appreciate that the memory 1512 can, and typically will, comprise other components which have been omitted for purposes of brevity. It should be noted, however, that the modules 137, 131, 132, 135, 139 may also be embodied as hardware.

Where any of the components described above comprises software or code, these components are embodied in a computer-readable medium for use by or in connection with an instruction execution system such as, for example, a processor in a computer system or other system. In the context of the present disclosure, a computer-readable medium refers to any tangible medium that can contain, store, or maintain the software or code for use by or in connection with an instruction execution system. For example, a computer-readable medium may store one or more programs for execution by the processing device 1502 described above.

More specific examples of the computer-readable medium may include a portable computer diskette, a random access memory (RAM), a read-only memory (ROM), an erasable programmable read-only memory (EPROM, EEPROM, or Flash memory), and a portable compact disc read-only memory (CDROM). As shown in FIG. 15, the FEXT mitigator 137 may further comprise mass storage 1526. For some embodiments, the mass storage 1526 may include a database 1528 for storing and managing data, such as bit-loading tables.

Figure 16:
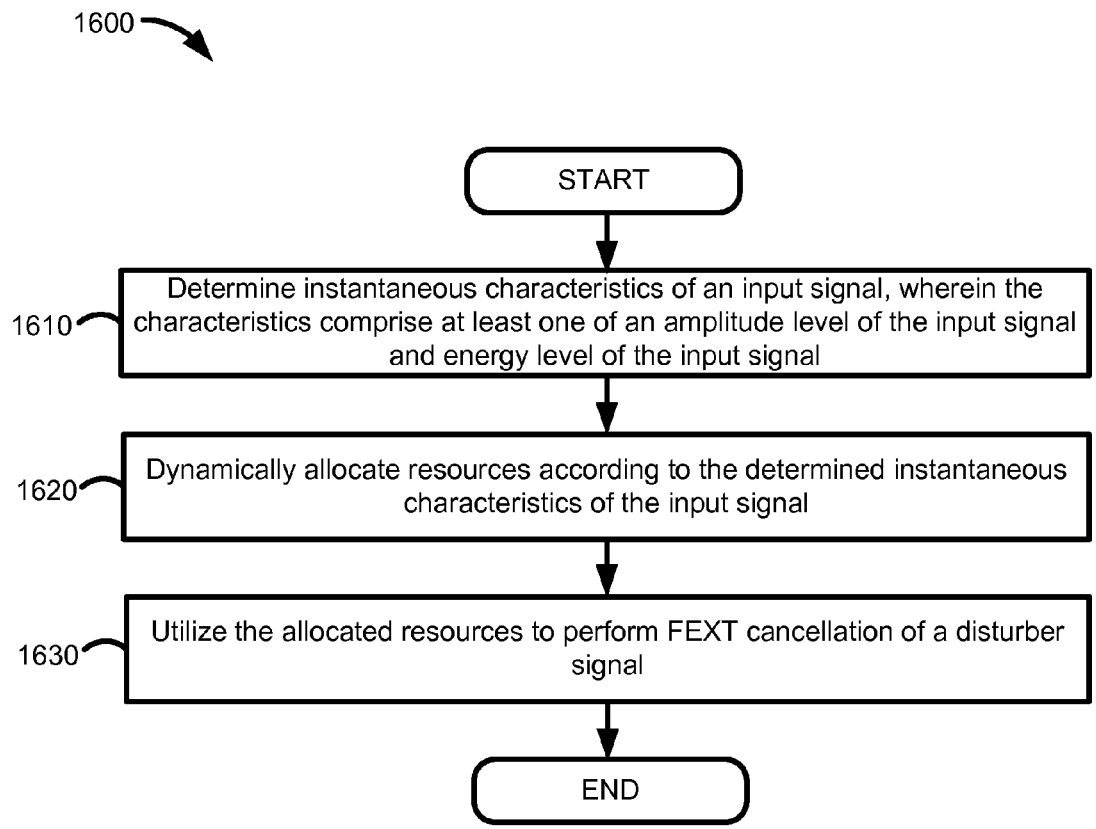
FIG. 16 depicts a top-level flow diagram for an embodiment of a process for performing partial self-FEXT cancellation in the system of FIG. 2.

FIG. 16 depicts a top-level flow diagram 1600 for an embodiment of a process for performing partial self-FEXT cancellation in the system of FIG. 2. Beginning with block 1610, the instantaneous characteristics of an input signal are determined. For such embodiments, the characteristics comprise at least one of an amplitude level of the input signal and energy level of the input signal. In block 1620, the method further comprises dynamically allocating resources according to the determined instantaneous characteristics of the input signal. Block 1630 proceeds by utilizing the allocated resources to perform FEXT cancellation of a disturber signal.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method of performing per-tone mitigation, comprising:
   receiving an input signal of an identified crosstalk disturber;
   determining one or more instantaneous characteristics of the input signal, wherein the characteristics comprise at least one of an amplitude level of the input signal and an energy level of the input signal;
   determining whether to process the input signal of the identified crosstalk disturber for mitigation according to the one or more instantaneous characteristics of the input signal; and
   based on the determination of whether to process the input signal for mitigation, either processing the input signal for mitigation or allowing the identified crosstalk disturber to be unmitigated, thereby performing partial crosstalk mitigation,
   wherein the per-tone mitigation comprises performing partial far-end crosstalk (FEXT) mitigation, and
   wherein determining instantaneous characteristics of the input signal according to the amplitude level comprises comparing the amplitude level to a predetermined threshold, and
   wherein FEXT cancellation is bypassed for constellation points associated with the input signal located within a decision boundary defined by the predetermined threshold.

2. The method of claim 1, wherein determining whether to process the input signal for mitigation comprises:
   allocating a plurality of resources; and
   utilizing the allocated resources to perform FEXT cancellation of one or more disturber signals.

3. The method of claim 1, wherein the predetermined threshold is applied symmetrically with respect to an x-axis and a y-axis of constellation points associated with the input signal.

4. The method of claim 1, wherein the predetermined threshold is applied asymmetrically with respect to an x-axis and a y-axis of constellation points associated with the input signal.

5. The method of claim 1, wherein the predetermined threshold is derived according to one or more of: an average input signal level; an amplitude of coupling between the one or more disturber signals and a victim user; and a target level of residual FEXT with respect to background noise after partial cancellation is performed.

6. The method of claim 1, wherein the predetermined threshold is derived according to a number of computational resources allocated for a given tone to a victim user, and wherein the predetermined threshold comprises real and imaginary parts for a component-wise comparison with a complex form of received signals to reduce computational complexity and reduce power consumption.

7. The method of claim 1, wherein the per-tone mitigation comprises frequency domain echo cancellation.

8. The method of claim 1, wherein the per-tone mitigation is implemented in a two-by-two multiple input multiple output (MIMO) receiver.

9. The method of claim 2, further comprising ordering disturbers based on at least one of: a degree of coupling and a level of the input signal of the one or more disturbers into a victim user.

10. The method of claim 2, wherein determining instantaneous characteristics of the input signal comprises:
   independently evaluating each input of the one or more disturber signals; and
   wherein determining whether to process the input signal includes selecting from among the one or more disturber signals for FEXT mitigation.

11. The method of claim 2, further comprising time multiplexing inputs of the one or more disturbers to a common multiplier.

12. The method of claim 2, further comprising:
   ordering coupling coefficients of the one or more disturbers into one or more victim users based on at least one of: degree of coupling and a level of the FEXT signal of the one or more disturbers into each victim user relative to a background noise; and reducing a level of computational complexity related to FEXT cancellation for a predetermined number of victim users.

13. The method of claim 6, wherein the component-wise comparison comprises:
   downshifting real and imaginary parts of the input signal; and
   comparing the downshifted real and imaginary parts to a zero value to determine whether to perform a multiplication operation to reduce power consumption.

14. The method of claim 6, wherein the component-wise comparison comprises:
   downshifting real and imaginary parts of the input signal; and
   comparing the downshifted real and imaginary parts to a zero value to determine whether or not to perform a multiplication operation for resource sharing.

15. A method of performing per-tone far-end crosstalk (FEXT) mitigation comprising:
   receiving an input signal of an identified crosstalk disturber;
   determining one or more instantaneous characteristics of the input signal, wherein the one or more instantaneous characteristics comprise one or more of amplitude of the input signal and an energy level of the input signal;
   selecting the identified crosstalk disturber from among one or more identified disturbers to cancel according to the one or more instantaneous characteristics, wherein selecting is performed on a per-DMT (discrete multi-tone) symbol basis, and wherein certain of the one or more identified disturbers are not selected for cancellation, thereby allowing partial crosstalk cancellation; and
   allocating resources based upon comparing the one or more instantaneous characteristics to a threshold, wherein selecting disturbers to cancel according to the one or more instantaneous characteristics comprises selecting only constellation points of respective disturbers that fall within a decision boundary formed by the threshold.

16. The method of claim 15, wherein the decision boundary formed by the threshold is symmetric with respect to an x-axis and a y-axis.

17. The method of claim 15, wherein the threshold is determined based on a probability density function (pdf) of FEXT resulting in each bin due to one or more disturbers.

18. The method of claim 15, wherein the threshold is determined based on a target level of residual FEXT to be achieved after FEXT cancellation.

19. The method of claim 15, wherein a common threshold is utilized for all disturbers.

20. The method of claim 15, wherein an individual threshold is determined for each disturber.

21. A system comprising:
   receiving input signals respectively corresponding to one or more identified crosstalk disturbers;
   an estimator configured to derive instantaneous characteristics for the one or more identified crosstalk disturbers using the input signals; and
   a selector for selecting from among the one or more identified crosstalk disturbers to cancel according to the instantaneous characteristics, wherein the selector is configured to compare the instantaneous characteristics to a threshold;
   a far-end crosstalk (FEXT) mitigator for performing FEXT mitigation on only the selected disturbers and not on certain other identified crosstalk disturbers; and
   an allocator for allocating resources based upon comparing the one or more instantaneous characteristics to a threshold, wherein selecting disturbers to cancel according to the one or more instantaneous characteristics comprises selecting only constellation points of respective disturbers that fall within a decision boundary formed by the threshold.

* * * * *

UNITED STATES PATENT AND TRADEMARK OFFICE
CERTIFICATE OF CORRECTION

PATENT NO. : 8,644,127 B2
APPLICATION NO. : 12/713482
DATED : February 4, 2014
INVENTOR(S) : Biyani et al.

Page 1 of 2

It is certified that error appears in the above-identified patent and that said Letters Patent is hereby corrected as shown below:

On the Title Page, item (51), under "Int. Cl.", in Column 1, Lines 1-2,
delete "H04J 1/12 (2006.01)
H04B 3/32 (2006.01)" and insert -- H04J 1/12 (2006.01) --, therefor.

On Title Page 2, item (56), under "OTHER PUBLICATIONS", in Column 1, Line 25,
delete "Gvsl:" and insert -- G.vdsl: --, therefor.

On Title Page 2, item (56), under "OTHER PUBLICATIONS", in Column 2, Line 8,
delete "Subsciber" and insert -- Subscriber --, therefor.

On Title Page 2, item (56), under "OTHER PUBLICATIONS", in Column 2, Line 16,
delete "et al," and insert -- et al., --, therefor.

On Title Page 2, item (56), under "OTHER PUBLICATIONS", in Column 2, Line 24,
delete "et al," and insert -- et al., --, therefor.

In the Drawings:

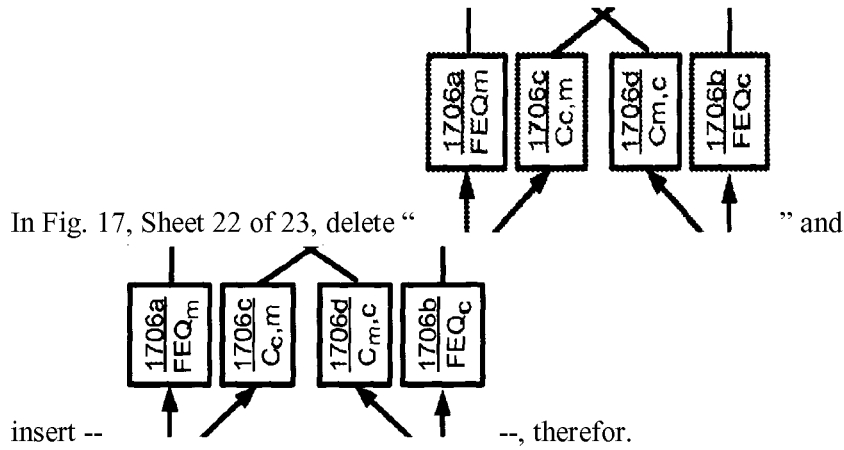

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,644,127 B2

In the Specifications:

In Column 2, Line 63, delete "FIG. 10B" and insert -- FIG. 10B. --, therefor.

In Column 8, Lines 50-51, delete "an an input" and insert -- an input --, therefor.

In Column 11, Line 21, delete "$\sigma'^2 \geq \sigma^{2}$" and insert -- $\sigma'^2 \geq \sigma^2$ --, therefor.

In Column 20, Line 8, delete "$\lambda_{imax}$" and insert -- $\lambda_{max}$ --, therefor.

In Column 20, Line 10, delete "$\varepsilon_i^{max} = \lambda_{imax} |c_i|^2$." and insert -- $\varepsilon_i^{max} = \lambda_{max} |c_i|^2$. --, therefor.